United States Patent
Kim et al.

(10) Patent No.: US 12,376,383 B2
(45) Date of Patent: Jul. 29, 2025

(54) SEMICONDUCTOR DEVICE AND LAYOUT METHOD THEREFOR

(71) Applicant: Samsung Electronics Co., Ltd., Suwon-si (KR)

(72) Inventors: Chunghee Kim, Yongin-si (KR); Minsu Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 671 days.

(21) Appl. No.: 17/831,277

(22) Filed: Jun. 2, 2022

(65) Prior Publication Data
US 2023/0084528 A1    Mar. 16, 2023

(30) Foreign Application Priority Data

Sep. 15, 2021 (KR) .................. 10-2021-0122897

(51) Int. Cl.
| | | |
|---|---|---|
| *H10D 89/10* | (2025.01) | |
| *G03F 1/36* | (2012.01) | |
| *G06F 30/392* | (2020.01) | |

(52) U.S. Cl.
CPC .............. *H10D 89/10* (2025.01); *G03F 1/36* (2013.01); *G06F 30/392* (2020.01)

(58) Field of Classification Search
CPC ........ H10D 89/10; H10D 84/975; G03F 1/36; G06F 30/392; G06F 30/394; G06F 30/3947; G06F 2119/06; H01L 23/5286; H01L 23/5386
USPC ........................................................ 716/119
See application file for complete search history.

(56) References Cited

U.S. PATENT DOCUMENTS

| | | | |
|---|---|---|---|
| 7,076,756 B2 | 7/2006 | Ichimiya | |
| 7,808,280 B2 | 10/2010 | Miyaba | |
| 2009/0113368 A1* | 4/2009 | Lin | H10D 89/10 716/122 |
| 2010/0270600 A1* | 10/2010 | Inukai | G06F 30/392 716/132 |
| 2016/0056083 A1 | 2/2016 | Do et al. | |

(Continued)

FOREIGN PATENT DOCUMENTS

| | | |
|---|---|---|
| JP | 2002-280456 A | 9/2002 |
| JP | 2007-165619 A | 6/2007 |
| JP | 2008-021947 A | 1/2008 |

(Continued)

*Primary Examiner* — Paul Dinh
(74) *Attorney, Agent, or Firm* — Harness, Dickey & Pierce, P.L.C.

(57) ABSTRACT

A semiconductor device including first and second standard cells disposed in one of a first direction and a second direction intersecting the first direction, the first and second directions parallel to a substrate, and each of the first and second standard cells including a gate structure and an active region, and a filler cell adjacent to the first standard cell in the second direction and adjacent to the second standard cell in the first direction, wherein an output node of the first standard cell is connected to an input node of the second standard cell, an output active contact providing an output node of the first standard cell is connected to a wiring active contact among at least one dummy active contact included in the filler cell, and an input wiring providing an input node of the second standard cell is connected to the wiring active contact may be provided.

20 Claims, 19 Drawing Sheets

(56) References Cited

U.S. PATENT DOCUMENTS

2020/0342158 A1  10/2020  Kim et al.

FOREIGN PATENT DOCUMENTS

| JP | 2011-191883 A | 9/2011 |
| JP | 2011-233869 A | 11/2011 |

\* cited by examiner

SEMICONDUCTOR DEVICE AND LAYOUT METHOD THEREFOR

CROSS TO REFERENCE TO RELATED APPLICATIONS

This application claims benefit of priority to Korean Patent Application No. 10-2021-0122897 filed on Sep. 15, 2021 in the Korean Intellectual Property Office, the disclosure of which is incorporated herein by reference in its entirety.

BACKGROUND

Example embodiments of the present disclosure relate to semiconductor devices and/or layout methods therefor.

The semiconductor device may include semiconductor devices formed on a semiconductor substrate and wirings for connecting the semiconductor devices to each other, and may be designed by disposing and connecting standard cells predefined in a library. As integration density of a semiconductor device has increased, various methods for efficiently disposing wirings for connecting semiconductor devices to each other have been suggested.

SUMMARY

Some example embodiments of the present disclosure are to provide semiconductor devices in which, to connect a first standard cell to a second standard cell receiving an output signal of the first standard cell as an input signal among standard cells, an active contact in a filler cell adjacent to the first standard cell and the second standard cell is used as a wiring, thereby increasing the degree of freedom in design may and efficiently disposing wirings, and layout methods therefor.

According to an example embodiment of the present disclosure, a semiconductor device may include a first standard cell and a second standard cell disposed in at least one of a first direction and a second direction intersecting the first direction, the first direction and the second direction being parallel to an upper surface of a substrate, and each of the first standard cell and the second standard cell including at least one gate structure and at least one active region, and a first filler cell adjacent to the first standard cell in the second direction and adjacent to the second standard cell in the first direction, wherein the output node of the first standard cell is connected to an input node of the second standard cell, wherein an output active contact providing the output node of the first standard cell is connected to a first wiring active contact among at least one dummy active contact included in the first filler cell, and wherein at least one input wiring providing the input node of the second standard cell is connected to the first wiring active contact.

According to an example embodiment of the present disclosure, a semiconductor device may include a plurality of standard cell regions disposed in a first direction and a second direction intersecting the first direction, the first direction and the second direction being parallel to an upper surface of a substrate, the plurality of standard cell regions including a first standard cell and a second standard cell, each of the first standard cell and the second standard cell including at least one gate structure and at least one active region, and at least one filler cell region being between a pair of adjacent ones of the plurality of standard cell regions, the at least one filler cell region including at least one filler cell, wherein the plurality of standard cell regions include a first standard cell region including a first standard cell and a second standard cell region including a second standard cell, the at least one filler cell region includes a first filler cell region that include a first filler cell, the first standard cell region is adjacent to the first filler cell region in the second direction, and the second standard cell region is adjacent to the first filler cell region in the first direction, and wherein an active contact extending in the second direction in the first standard cell region and the first filler cell region is connected to at least one input wiring extending in the first direction in both the second standard cell region and the first filler cell region, by a lower via.

According to an example embodiment of the present disclosure, a semiconductor device may include a first standard cell providing a first unit circuit, a second standard cell at a position different from a position of the first standard cell in one of a first direction and a second direction intersecting the first direction, the first direction and the second direction being parallel to an upper surface of a substrate, the second standard cell providing a second unit circuit, and a first filler cell adjacent to the second standard cell in the first direction, adjacent to the first standard cell in the second direction, and having a dummy active region, wherein each of the first standard cell and the second standard cell includes at least one input wiring and at least one output wiring, the output wiring in the first standard cell is on a level lower than a level of the input wiring thereof, and the output wiring in the second standard cell is on a level higher than a level of the input wiring thereof, and wherein the output wiring of the first standard cell extends to the first filler cell, and is in contact with both the dummy active region and the input wiring of the second standard cell that extends to the first filler cell, in a third direction perpendicular to the upper surface of the substrate.

According to an example embodiment of the present disclosure, a layout method for a semiconductor device including a plurality of standard cells may include selecting two or more standard cells including a first standard cell and a second standard cell among the plurality of standard cells with reference to a standard cell library, and disposing the two or more standard cells in one of a first direction and a second direction intersecting the first direction, disposing a first filler cell adjacent to the first standard cell in the second direction and adjacent to the second standard cell in the first direction, connecting one of active contacts of the first standard cell to a dummy active contact of the first filler cell in the second direction to function as an output wiring of the first standard cell, determining a select wiring of the second standard cell connected to both the output wiring of the first standard cell and connected to at least one of gate structures of the second standard cell as an input wiring of the second standard cell, and connecting the standard cells to each other to generate a layout.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, some example embodiments of the present disclosure will be described as follows with reference to the accompanying drawings.

As used herein, expressions such as "one of" and "at least one of," when preceding a list of elements, modify the entire list of elements and do not modify the individual elements of the list. Thus, for example, both "at least one of A, B, or C" and "at least one of A, B, and C" means either A, B, C, or any combination thereof.

Figure 1:
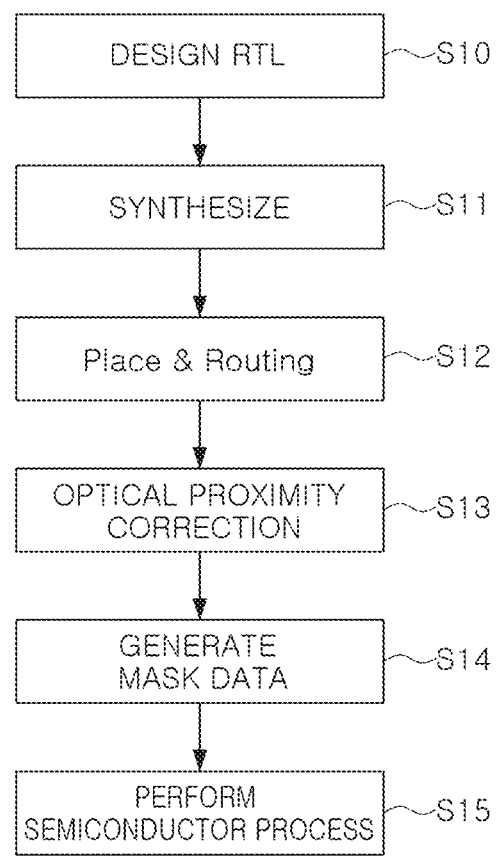
FIG. 1 is a flowchart illustrating a method of manufacturing a semiconductor device according to an example embodiment of the present disclosure.

FIG. 1 is a flowchart illustrating a method of manufacturing a semiconductor device according to an example embodiment.

Referring to FIG. 1, a method of manufacturing a semiconductor device in an example embodiment may start with a register transfer level (RTL) design (S10). An RTL code generated by the RTL design may define functionality of the semiconductor device. For example, the RTL code may be represented in a language such as Very High Speed Integrated Circuit (VHSIC) Hardware Description Language (VHDL), Verilog, or the like.

When the RTL code is generated, logic synthesis for generating net list data of the semiconductor device from the RTL code may be performed using standard cells stored in a desired (or alternatively, predetermined) library (S11). The net list data may include standard cells and data defining a connection relationship between the standard cells, and may be generated by a desired (or alternatively, predetermined) semiconductor design tool. The standard cells may provide various circuits such as AND, OR, NOR, inverter, Or And Inverter (OAI), And Or Inverter (AOI), flip-flop, latch, or the like.

Thereafter, a placement and routing operation for generating layout data with reference to the net list data may be executed (S12). The placement and routing operation of operation S12 may be performed with reference to the layout of standard cells stored in the library. A semiconductor design tool for performing the placement and routing operation may generate layout data including placement information of the standard cells and routing information for connecting the placed standard cells by referring to the library and the net list data in which standard cells are stored.

When the placement and routing operation is completed, optical proximity calibration may be performed on the layout data generated in operation S12 (S13). When the optical proximity calibration is completed, mask data for forming various patterns on a plurality of layers may be generated (S14). Exposure may be performed on a photoresist using the mask data and a mask may be generated, and thereafter, a semiconductor operation (e.g., semiconductor manufacturing processes) using the mask may be performed (S15), thereby manufacturing a semiconductor device.

In the placement and routing operation, the standard cells may be disposed in standard cell regions, and empty spaces between the standard cell regions may be allocated to filler cell regions and may be filled with filler cells. In the routing operation, wiring patterns for connecting semiconductor devices included in the standard cells to each other may be formed.

For example, in each of the standard cells, the positions of at least a portion of the wiring patterns for connecting the semiconductor devices to each other may be provided or predefined, and for example, wiring patterns desired for implementing the circuit provided by the standard cells may be provided or predefined. The wiring patterns provided or predefined in the standard cells may include an input wiring for receiving an input signal from another standard cell and an output wiring for sending an output signal to another standard cell.

The input wiring and the output wiring included in different standard cells may be connected to each other by different wiring patterns disposed above the input wiring and the output wiring. In this case, a wiring pattern for connecting the input wiring and the output wiring may be present, and thus limitations in designing the limited wiring patterns may increase. Accordingly, freedom in design of the wiring patterns may be reduced, and the length of a routing path for connecting the input wiring to the output wiring may increase, and thus electrical properties of the semiconductor device may be deteriorated.

In connecting the first standard cell to the second standard cell receiving the output signal of the first standard cell as an input signal to each other, the active contact of the filler cell adjacent to the first standard cell and the second standard cell may be used as a wiring. Accordingly, freedom in design of the wiring patterns including the input wiring and the output wiring may improve. Also, by shortening the length of the routing path connecting the first standard cell and the second standard cell, electrical properties of the semiconductor device may improve.

Figure 2:
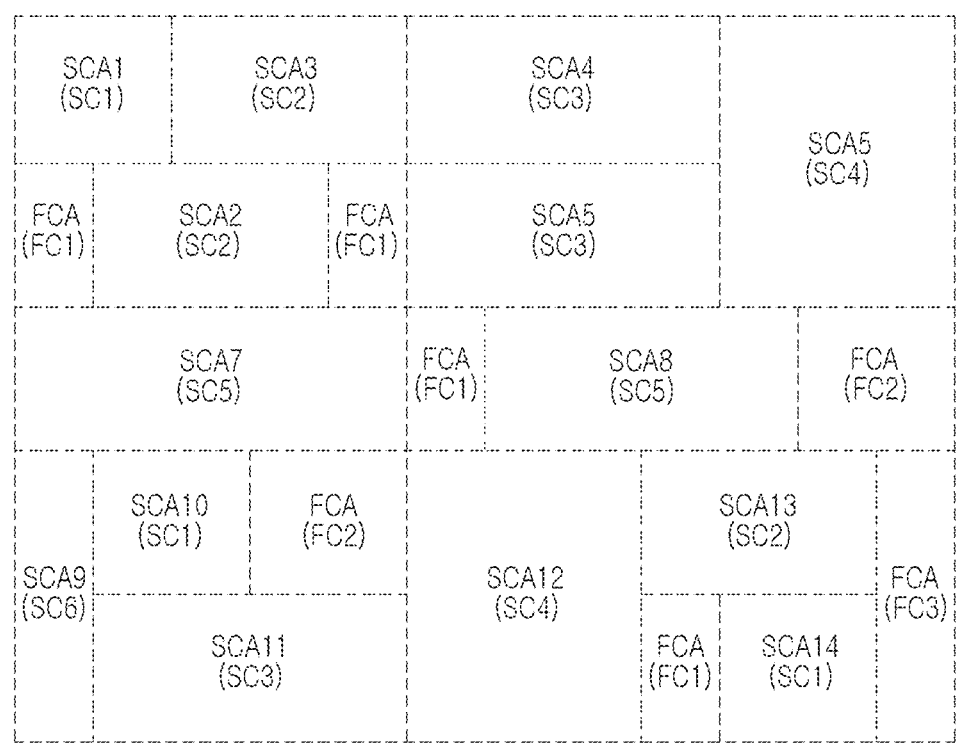
FIGS. 2 and 3 are plan diagrams illustrating a semiconductor device according to some example embodiments of the present disclosure.
Figure 3:
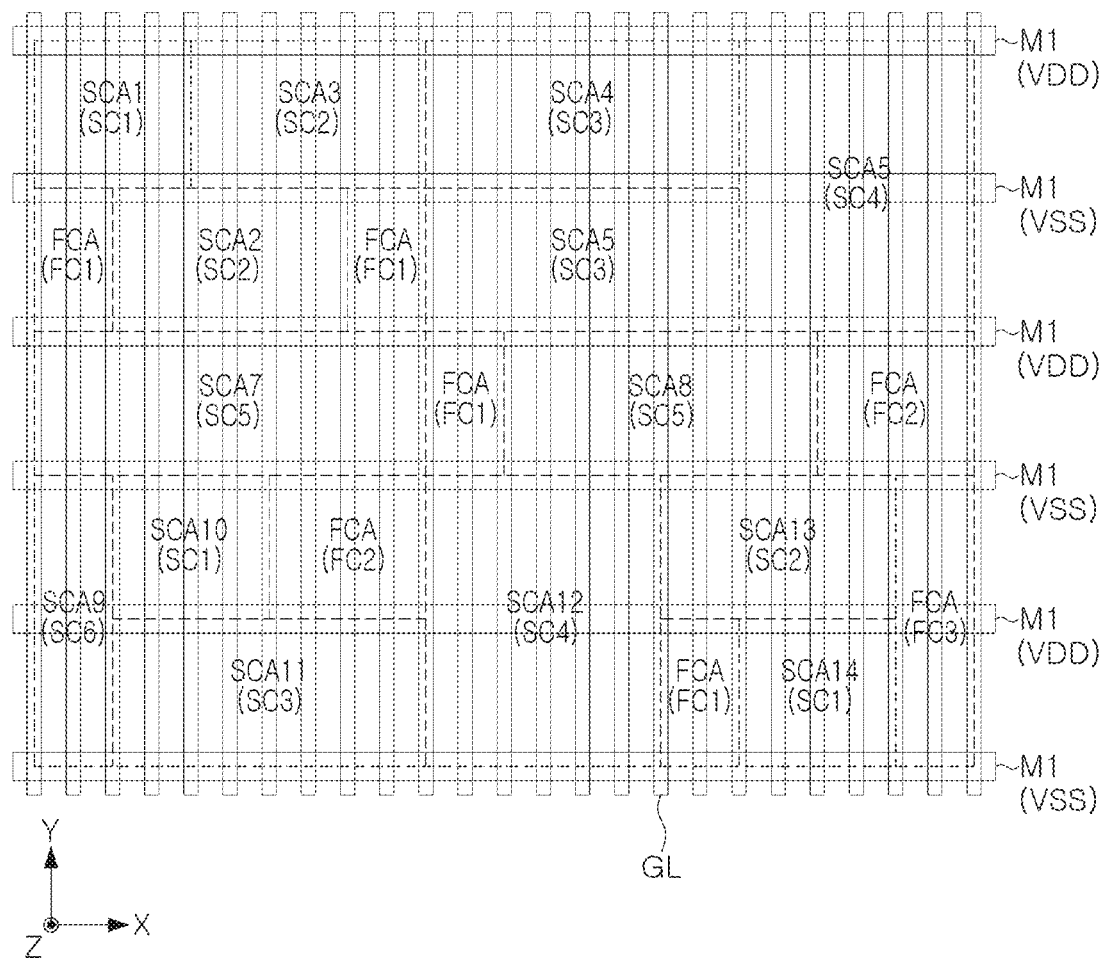

FIGS. 2 and 3 are plan diagrams illustrating a semiconductor device according to some example embodiments.

FIG. 2 is a plan diagram illustrating a semiconductor device according to an example embodiment, and FIG. 3 is a plan diagram illustrating power supply wiring patterns M1

(VDD), M1 (VSS) and gate patterns GL in addition to the example in the plan diagram in FIG. 2.

Referring to FIGS. 2 and 3, the semiconductor device may include standard cell regions SCA1-SCA14 and filler cell regions FCA. Standard cells SC1-SC6 may be disposed in the standard cell regions SCA1-SCA14, and the standard cells SC1-SC6 may provide semiconductor devices and/or circuits actually operating. Filler cells FC1-FC2 may be disposed in the filler cell regions FCA.

The first to sixth standard cells SC1-SC6 may be disposed in the standard cell regions SCA1-SCA14 in the example embodiments illustrated in FIGS. 2 and 3, but example embodiments thereof are not limited thereto. More various standard cells may be disposed in a greater number of standard cell regions. Similarly, the first and second filler cells FC1-FC2 may be disposed in the filler cell regions FCA, but more various filler cells may be disposed in a greater number of filler cell regions.

The semiconductor device may include power supply wirings M1 (VDD) and M1 (VSS) extending in a first direction (X-axis direction). The power supply wirings M1 (VDD) and M1 (VSS) may be disposed or arranged in a second direction (Y-axis direction) intersecting the first direction. For example, the power supply wirings M1 (VDD) and M1 (VSS) may extend along a boundary between the standard cell regions SCA1-SCA14 and the filler cell regions FCA or may intersect at least one of the standard cell regions SCA1-SCA14 and the filler cell regions FCA. The power supply wirings M1 (VDD) and M1 (VSS) may include first power supply wirings M1 (VDD) transferring a first power voltage VDD, and second power supply wirings M1 (VSS) transferring a second power voltage VSS lower than the first power voltage VDD, and the first power supply wirings M1 (VDD) and the second power supply wirings M1 (VSS) may be alternately disposed in the second direction.

The gate patterns GL may extend in the second direction and may be separated from each other in the first direction. The gate patterns GL may include gate structures providing a semiconductor device and dummy gate structures. For example, the gate patterns GL disposed on boundaries between the standard cell regions SCA1-SCA14 and the filler cell regions FCA may be dummy gate structures.

Referring to FIGS. 2 and 3, the first standard cell SC1 disposed in the first standard cell region SCA1 may be adjacent to the first filler cell FC1 in the second direction. Further, the first filler cell FC1 may be adjacent to the second standard cell SC2 disposed in the second standard cell region SCA2. In an example embodiment, the output signal of the first unit circuit provided by the first standard cell SC1 may be transferred as an input signal of the second unit circuit provided by the second standard cell SC2.

In an example embodiment, the output node of the first standard cell SC1 may be connected to the input node of the second standard cell SC2 using at least one dummy active contact included in the first filler cell FC1 as a wiring pattern. For example, an output active contact providing an output node among active contacts of the first standard cell SC1 may be integrated with and connected to one of the dummy active contacts included in the first filler cell FC1. The output active contact of the first standard cell SC1 and the dummy active contact of the first filler cell FC1 may be integrated with and connected to each other below the second power supply wirings M1 (VS S).

The dummy active contact of the first filler cell FC1 integrated with and connected to the output active contact of the first standard cell SC1 may be connected to the second standard cell SC2 through at least one input wiring included in the second standard cell SC2. For example, the dummy active contact of the first filler cell FC1 may be connected to one of the gate structures included in the second standard cell SC2 through an input wiring included in the second standard cell SC2. In an example embodiment, the input wiring may be disposed on the same level as a level of the power supply wirings M1 (VDD) and M1 (VSS).

Accordingly, in an example embodiment, the output node of the first standard cell SC1 may be connected to the input node of the second standard cell SC2 through the first filler cell FC1 in a region further below the input wiring and the power supply wirings M1 (VDD) and M1 (VSS) in the third direction (Z-axis direction). Accordingly, freedom in design of the wiring patterns may improve, and the routing path connecting the output node of the first standard cell SC1 to the input node of the second standard cell SC2 may be reduced, thereby improving performance of the semiconductor device.

Figure 4:
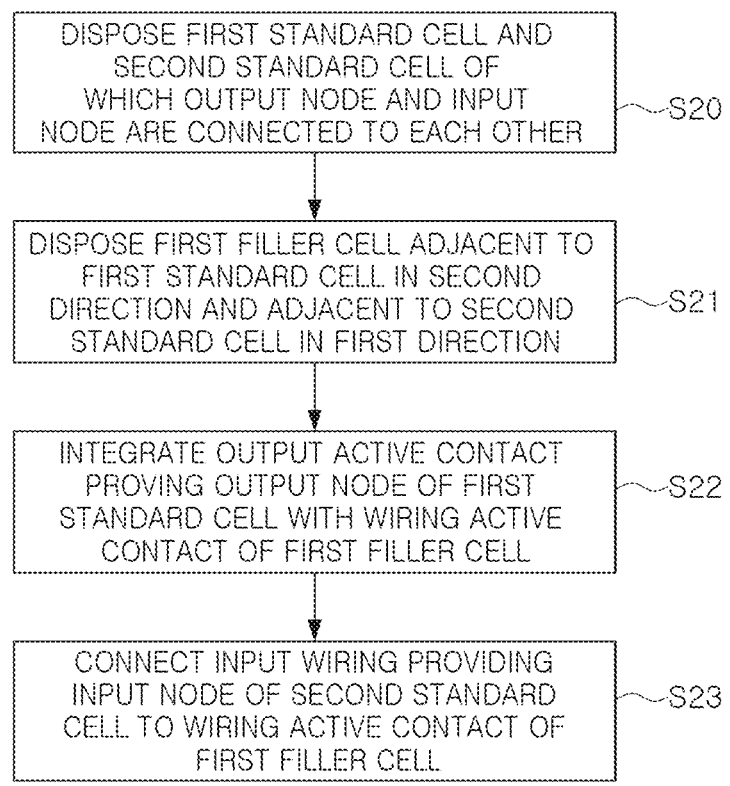
FIG. 4 is a flowchart illustrating a layout method for a semiconductor device according to an example embodiment of the present disclosure.

FIG. 4 is a flowchart illustrating a layout method for a semiconductor device according to an example embodiment.

Referring to FIG. 4, the layout method for a semiconductor device in an example embodiment may start with disposing a first standard cell and a second standard cell in which an output node and an input node are connected to each other (S20). The first standard cell may provide a first unit circuit, and the second standard cell may provide a second unit circuit. The output signal of the first standard cell may be an input signal of the second standard cell, such that the output node of the first unit circuit provided by the first standard cell may be connected to the input node of the second unit circuit provided by the second standard cell.

The first standard cell may be disposed around the second standard cell, and the first filler cell may be disposed adjacent to the first standard cell and the second standard cell (S21). For example, the first filler cell may be adjacent to the second standard cell in the first direction and may be adjacent to the first standard cell in the second direction. The first direction and the second direction may intersect each other. For example, the first direction may be a direction in which active regions may extend, and the second direction may be a direction in which gate patterns may extend. Accordingly, active contacts may extend in the second direction in each of the first standard cell, the second standard cell, and the first filler cell.

The output node in the first standard cell may be provided by at least one of the active contacts. When the first filler cell is disposed, an output active contact providing an output node among the active contacts of the first standard cell may be integrated with a wiring active contact among at least one dummy active contact included in the first filler cell (S22). The integrating the wiring active contact with the output active contact in operation S22 may indicate that the wiring active contact and the output active contact may be physically connected to each other and may extend in the second direction as a single active contact. The output active contact and the wiring active contact integrated with and connected to each other may provide a single output wiring.

When the wiring active contact and the output active contact are integrated with and connected to each other, the input wiring providing the input node in the second standard cell may be connected to the dummy active contact of the first filler cell (S23). For example, the input wiring of the second standard cell may be a wiring extending in the first direction, and may extend to the first filler cell across a boundary between the second standard cell and the first filler cell. The input wiring of the second standard cell extending to the first filler cell may be connected to each other through the wiring active contact of the first filler cell and the active via.

Figure 5:
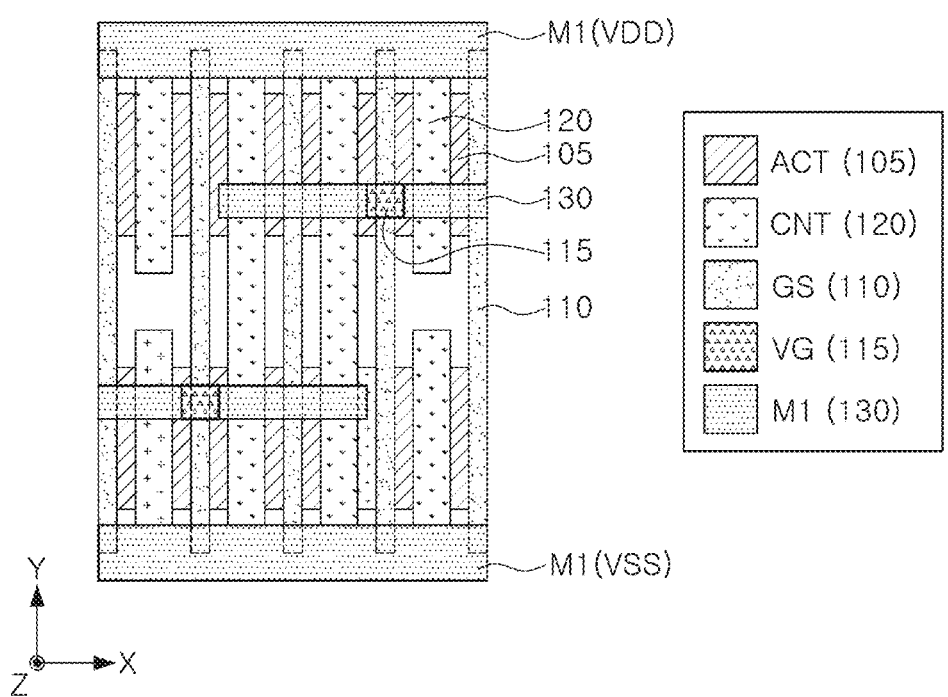
FIGS. 5 and 6 are plan diagrams illustrating standard cells included in a semiconductor device according to some example embodiments of the present disclosure.
Figure 6:
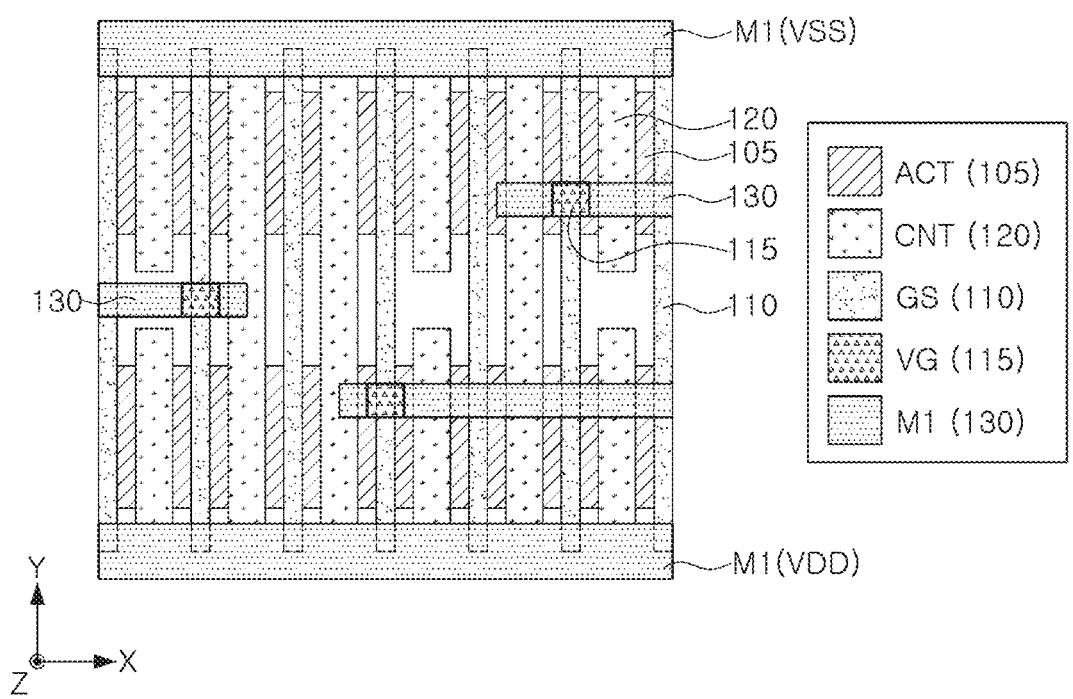

FIGS. 5 and 6 are plan diagrams illustrating standard cells included in a semiconductor device according to some example embodiments.

Referring to FIGS. 5 and 6, in the semiconductor device 100 in the example embodiments, each of the standard cells may include active regions 105 extending in a first direction (X-axis direction), and gate structures 110 extending in a second direction (Y-axis direction) and intersecting the active regions 105. The active regions 105 and the gate structures 110 may provide a plurality of semiconductor devices.

As an example, one of the gate structures 110 and the active regions 105 disposed on both sides thereof may provide a transistor. The active regions 105 may be connected to the active contacts 120. Transistors included in each of the standard cells may be connected to each other and may provide a unit circuit. For example, each of the standard cells may provide an inverter, a NAND gate, an OR gate, an or-and-inverter (OAI) circuit, an and-or-inverter (AOI) circuit, a circuit such as a flip-flop or a latch, and the like.

Further, the standard cell 100 may include lower wiring patterns 130 connected to at least one of the gate structures 110 and the active contacts 120. Referring to FIGS. 5 and 6, each of the lower wiring patterns 130 may be connected to at least one of the gate structures 110 through a gate via 115 and may provide a signal path through which an input signal is transferred to a unit circuit provided by the standard cell. The lower wiring patterns 130 may be formed of a conductive material such as a metal or metal silicide, and may extend in the first direction as illustrated in FIGS. 5 and 6.

For example, the unit circuit provided by the standard cell may receive a desired (or alternatively, predetermined) input signal and may output an output signal corresponding to the input signal. An input signal may be input to one of the gate structures 110 through at least one of the lower wiring patterns 130, and an output signal may be output by at least one of the active contacts 120 through at least one of the active regions 105.

In the semiconductor device 100 in an example embodiment, at least one of the standard cells may not include the lower wiring pattern 130 connected to the active contact 120 emitting an output signal. The active contact 120 for emitting an output signal from the standard cell may be integrated with and connected to a dummy active contact of a filler cell adjacent to the standard cell in the second direction, and the dummy active contact may be connected to at least one of the lower wiring patterns 130 for receiving an input signal from another standard cell adjacent to the filler cell. Accordingly, an output signal may be transferred to another standard cell using one of the active contacts 120 of the standard cell, and the number of wiring patterns desired to transmit a signal between the standard cells may be reduced, thereby increasing freedom in design, and improving RC properties of the semiconductor device.

Figure 7:
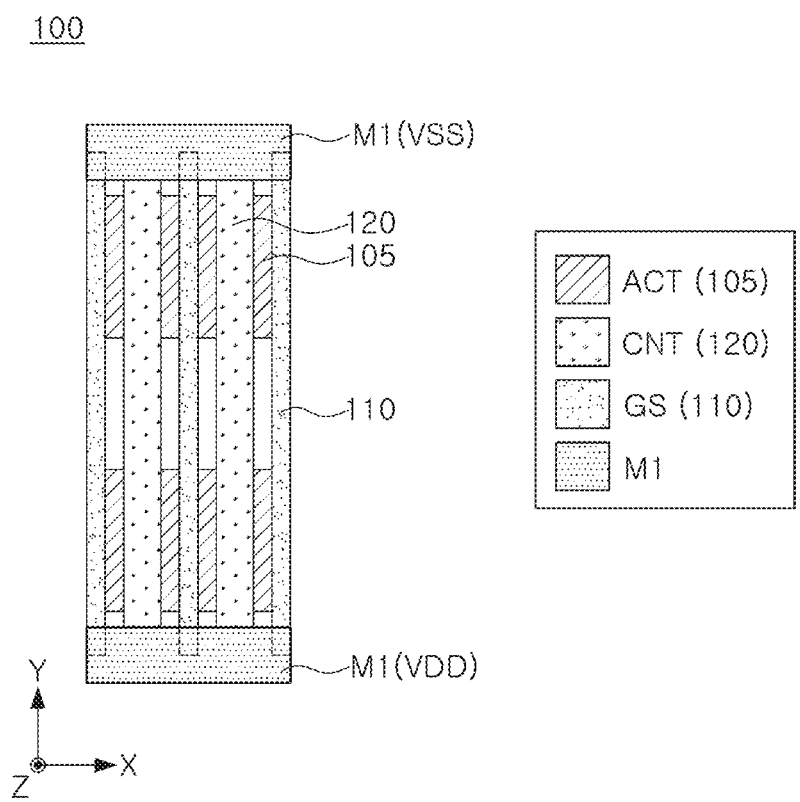
FIG. 7 is a plan diagram illustrating a filler cell included in a semiconductor device according to an example embodiment of the present disclosure.

FIG. 7 is a plan diagram illustrating a filler cell included in a semiconductor device according to an example embodiment.

Referring to FIG. 7, the filler cell of a semiconductor device in an example embodiment may include active regions 105 extending in the first direction (X-axis direction), and gate structures 110 extending in the second direction (Y-axis direction) and intersecting the active regions 105. The active regions 105 may be connected to the active contacts 120.

For example, the active regions 105 included in the filler cell may be dummy active regions, and the gate structures 110 may be dummy gate structures. Further, the active contacts 120 may be dummy active contacts. Accordingly, the filler cell may not provide devices and unit circuits actually involved in the operation of the semiconductor device 100.

The standard cells described in the aforementioned example embodiments with reference to FIGS. 5 and 6 may be connected to each other through the filler cell described in the aforementioned example embodiment described with reference to FIG. 7. Hereinafter, a structure for connecting standard cells through a filler cell will be described in greater detail with reference to FIG. 8.

Figure 8:
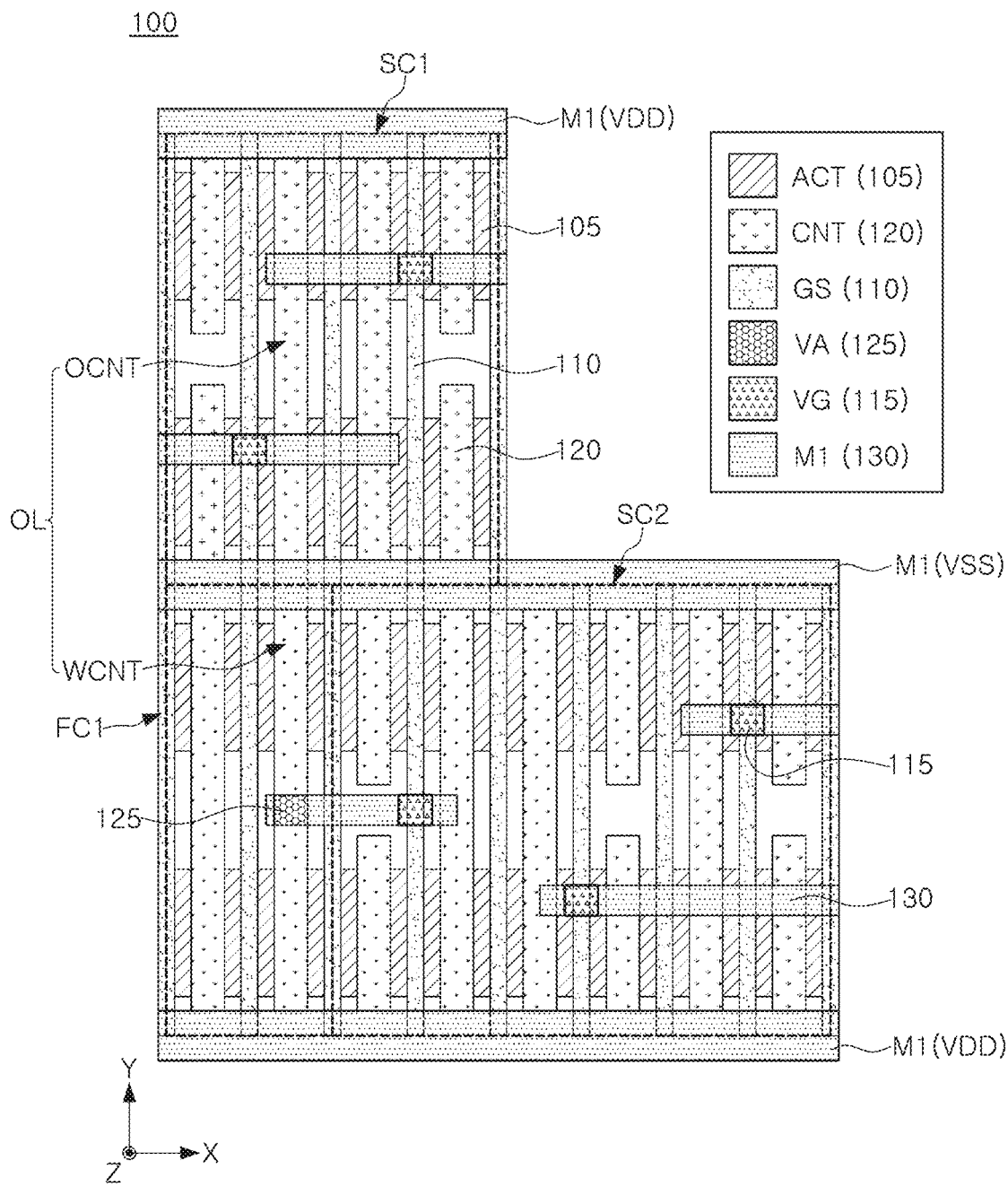
FIG. 8 is a plan diagram illustrating a partial region of a semiconductor device according to an example embodiment of the present disclosure.

FIG. 8 is a plan diagram illustrating a partial region of a semiconductor device according to an example embodiment.

Referring to FIG. 8, the semiconductor device 100 in an example embodiment may include a first standard cell SC1, a second standard cell SC2, and a first filler cell FC1. The first standard cell SC1, the second standard cell SC2, and the first filler cell FC1 may be disposed in the first direction (X-axis direction) and the second direction (Y-axis direction). Referring to FIG. 8, the first filler cell FC1 may be adjacent to the first standard cell SC1 in the second direction and may be adjacent to the second standard cell SC2 in the first direction.

An output signal of the first standard cell SC1 may be input to the second standard cell SC2 as an input signal. Therefore, in terms of a circuit, the output node of the first standard cell SC1 and the input node of the second standard cell SC2 may be connected to each other, and the output active contact OCNT providing an output node among the active contacts 120 of the first standard cell SC1 may to be electrically connected to at least one of the gate structures 110 of the second standard cell SC2.

In an example embodiment, the first standard cell SC1 and the second standard cell SC2 may be connected to each other through the first filler cell FC1. Referring to FIG. 8, the output active contact OCNT of the first standard cell SC1 may be integrated with and connected to one of the dummy active contacts 120 included in the first filler cell FC1. For example, a dummy active contact connected to the output active contact OCNT may be defined as a wiring active contact WCNT.

The output active contact OCNT and the wiring active contact WCNT may be connected to each other in the second direction, thereby forming a structure (e.g., an integral structure). For example, the output active contact OCNT and the wiring active contact WCNT may form an active contact, and may provide the output wiring OL. Referring to FIG. 8, the power supply wirings M1 (VDD) and M1 (VSS) may be disposed along the boundaries between the first standard cell SC1 and the second standard cell SC2 and the first filler cell FC1. The output active contact OCNT and the wiring active contact WCNT may be integrated with each other below the second power supply wiring M1 (VSS) disposed on the boundary between the first standard cell SC1 and the first filler cell FC1.

Accordingly, the output signal output by the first standard cell SC1 may be transmitted to the first filler cell FC1 through the output active contact OCNT and the wiring active contact WCNT. In the first filler cell FC1, the wiring active contact WCNT may be connected to one of the lower wiring patterns 130 through the active via 125. For example, the lower wiring pattern 130 connected to the wiring active contact WCNT through the active via 125 may be an input wiring through which the second standard cell SC2 may receive one of the input signals.

In the example embodiment illustrated in FIG. 8, the output signal of the first standard cell SC1 may be input to one of the gate structures 110 included in the second standard cell SC2 through the output active contact OCNT, the wiring active contact WCNT, the active via 125 and the input wiring. Accordingly, the output signal of the first standard cell SC1 may be transmitted to the second standard cell SC2 without other wiring patterns disposed above the lower wiring patterns 130 in the third direction (the Z-axis direction), and freedom in wiring design in the semiconductor device 100 may improve. Further, by shortening the length of the routing path connecting the first standard cell SC1 to the second standard cell SC2, performance of the semiconductor device 100 may improve.

Figure 9:
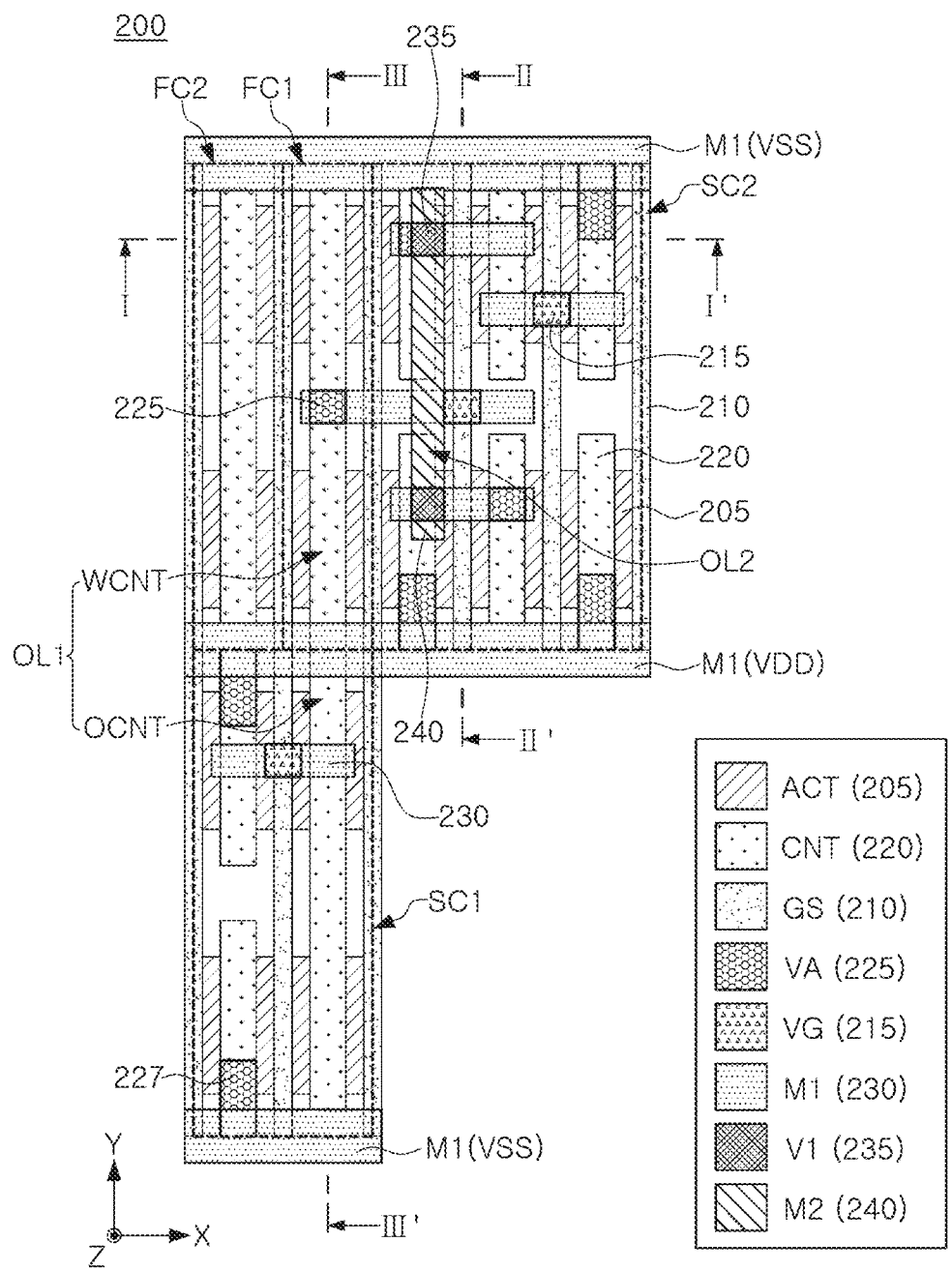
FIG. 9 is a plan diagram illustrating a partial region of a semiconductor device according to an example embodiment of the present disclosure.

FIG. 9 is a plan diagram illustrating a partial region of a semiconductor device according to an example embodiment.

Referring to FIG. 9, a semiconductor device 200 in an example embodiment may include a first standard cell SC1, a second standard cell SC2, a first filler cell FC1, and a second filler cell FC2. The first filler cell FC1 may be disposed between the second filler cell FC2 and the second standard cell SC2 in the first direction (the X-axis direction), and the first standard cell SC1 may be adjacent to the first filler cell FC1 and the second filler cell FC2 in the second direction (the Y-axis direction).

The first standard cell SC1 and the second standard cell SC2 may provide different unit circuits. For example, the first standard cell SC1 may include two transistors and may provide an inverter circuit. The second standard cell SC2 may include four transistors and may provide a NAND gate circuit.

In the semiconductor device 200, an output signal of the first standard cell SC1 may be input to the second standard cell SC2 as an input signal. In terms of a circuit, an output node of the inverter provided by the first standard cell SC1 may be connected to one of input nodes of the NAND gate circuit provided by the second standard cell SC2, which will be described with reference to FIGS. 10 and 11 in the description below.

Figure 10:
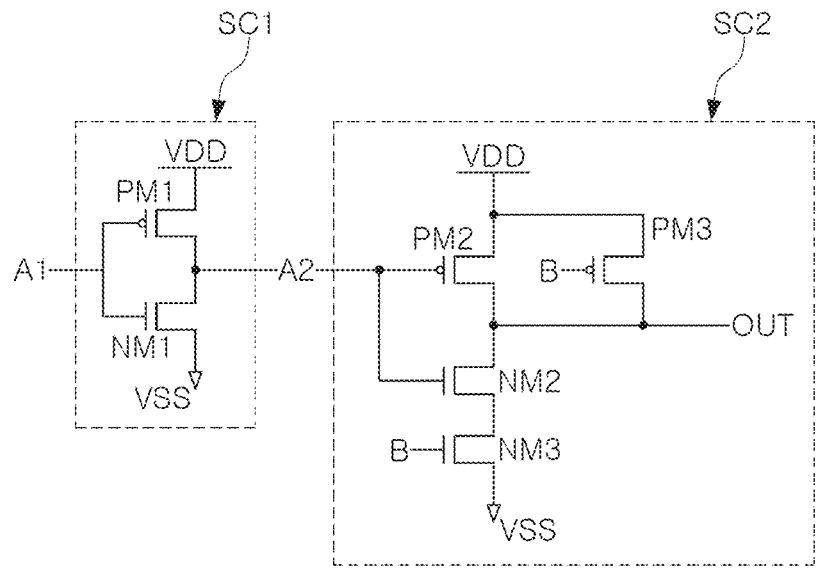
FIGS. 10 and 11 are diagrams illustrating a circuit and a logic corresponding to the partial region of the semiconductor device illustrated in FIG. 9, respectively, according to an example embodiment of the present disclosure.
Figure 11:
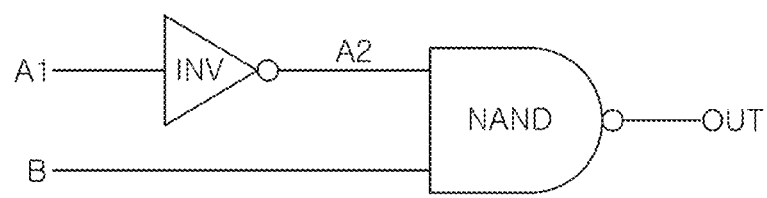

FIGS. 10 and 11 are diagram illustrating a circuit and a logic corresponding to the partial region of the semiconductor device illustrated in FIG. 9, respectively.

Referring to FIG. 10, the first standard cell SC1 may include two transistors PM1 and NM1, and may include a first PMOS transistor PM1 and a first NMOS transistor NM1. The first PMOS transistor PM1 and the first NMOS transistor NM1 may be connected to each other in series, the first PMOS transistor PM1 may receive a first power voltage VDD, and the first NMOS transistor NM1 may receive a second power supply voltage VSS.

The input signal A1 of the first standard cell SC1 may be input to gates of the first PMOS transistor PM1 and the first NMOS transistor NM1, and the output signal A2 of the first standard cell SC1 may be output by a node at which the first PMOS transistor PM1 and the first NMOS transistor NM1 are connected to each other. The first standard cell SC1 may provide an inverter circuit INV as illustrated in FIG. 11.

The second standard cell SC2 may include four transistors PM2, PM3, NM2, and NM3. The second PMOS transistor PM2 and the third PMOS transistor PM3 may be connected to each other in parallel and may receive the first power voltage VDD. The second NMOS transistor NM2 and the third NMOS transistor NM3 may be connected to each other in series, and the third NMOS transistor NM3 may receive the second power voltage VSS. The second NMOS transistor NM2 may be connected to the second PMOS transistor PM2 and the third PMOS transistor PM3.

The second standard cell SC2 may provide a NAND gate circuit NAND as illustrated in FIG. 11. Accordingly, the second standard cell SC2 may receive the first input signal A2 and the second input signal B, and may output an output signal OUT. The first input signal A2 may be input to gates of the second PMOS transistor PM2 and the second NMOS transistor NM2, and the second input signal B may be input to gates of the third PMOS transistor PM3 and the third NMOS transistor NM2. The output signal OUT may be output by an output node at which the second PMOS transistor PM2, the third PMOS transistor PM3, and the second NMOS transistor NM2 are connected to each other.

Referring to FIGS. 10 and 11, among the input signals A2 and B input to the NAND gate circuit NAND, the first input signal A2 may be an output signal of the inverter circuit INV. Accordingly, the output node of the first standard cell SC1 may be electrically connected to one of the input nodes of the second standard cell SC2. In an example embodiment, the output node of the first standard cell SC1 may be connected to one of the input nodes of the second standard cell SC2 using the dummy active contact of the first filler cell FC1 adjacent to the first standard cell SC1 and the second standard cell SC2 as a wiring. Hereinafter, a connection structure between the first standard cell SC1 and the second standard cell SC2 will be described in greater detail with reference to FIG. 9.

Referring back to FIG. 9, each of the first standard cell SC1, the second standard cell SC2, the first filler cell FC1, and the second filler cell FC2 may include active regions 205 extending in the first direction, and gate structures 210 extending in the second direction and intersecting the active regions 205. For example, one of the gate structures 210, and the active regions 205 disposed on both sides thereof may provide a transistor.

Active regions 205 may be connected to active contacts 220. Transistors included in each of the standard cells SC1 and SC2 may be connected to each other by active contacts 220 and/or lower wiring patterns 230 and may provide a unit circuit. The lower wiring patterns 230 may be connected to the gate structures 210 and/or the active contacts 220 through the lower vias 215 and 225. For example, each of the lower wiring patterns 230 may be connected to at least one of the gate structures 210 through the gate via 215 or to at least one of the active contacts 220 through the active via 225. In some example embodiments, at least one of the lower wiring patterns 230 may be connected to at least one of the gate structures 210 and at least one of the active contacts 220 in common.

As described above, the first standard cell SC1 may provide an inverter circuit INV, and the second standard cell SC2 may provide a NAND gate circuit NAND. Further, the output signal A2 of the inverter circuit INV provided by the first standard cell SC1 is provided as a first input signal A2 to the NAND gate circuit NAND provided by the second standard cell SC2. Accordingly, the output node of the first standard cell SC1 may need to be connected to an input node receiving the first input signal A2 among the input nodes of the second standard cell SC2.

In an example embodiment, the dummy active contact of the first filler cell FC1 may be provided as a routing path connecting the output node of the first standard cell SC1 to the input node of the second standard cell SC2. Referring to FIG. 9, the output active contact OCNT providing the output node of the inverter circuit INV in the first standard cell SC1 may be integrated with and connected to the dummy active contact of the first filler cell FC1. For example, a dummy active contact connected to the output active contact OCNT may be defined as a wiring active contact WCNT. The output active contact OCNT and the wiring active contact WCNT may be integrated with and connected to each other below the first power supply wiring M1 (VDD) extending in the first direction along the boundary between the first standard cell SC1 and the first filler cell FC1.

The wiring active contact WCNT may be connected to one of the lower wiring patterns 230 through the active via 225 in the first filler cell FC1. The lower wiring pattern 230 connected to the wiring active contact WCNT may extend from the first filler cell FC1 to the second standard cell SC2 in the first direction, and may be connected to at least one of the gate structures 210 disposed in the second standard cell SC2 through a gate via 215 in the second standard cell SC2. For example, the gate structure 210 connected to the wiring active contact WCNT through the lower wiring pattern 230 may provide a gate of the second PMOS transistor PM2 and the second NMOS transistor NM2 receiving the first input signal A2 in the NAND inverter circuit NAND.

The output signal A2 output by the first standard cell SC1 through the output active contact OCNT may be transferred to the wiring active contact WCNT, and then may be transferred to the gate structure 210 of the second standard cell SC2 through the lower wiring pattern 230. Accordingly, an output node in the first standard cell SC1 outputting the output signal A2 may be connected to an input node of the second standard cell SC2 receiving the first input signal A2.

The output node for emitting the output signal OUT of the second standard cell SC2 may be provided by the upper wiring pattern 240 disposed above the lower wiring patterns 230. The upper wiring pattern 240 may be connected to the lower wiring patterns 230 through the upper via 235. In the example embodiment in FIG. 9, the upper wiring pattern 240 of the second standard cell SC2 may be connected to a pair of lower wiring patterns 230, which are connected to the active regions 205 of the second and third PMOS transistors PM2 and PM3 and the active region 205 of the second NMOS transistor NM2, respectively.

Accordingly, in the example embodiment illustrated in FIG. 9, the output wiring of the first standard cell SC1 and the output wiring of the second standard cell SC2 may be defined on different levels in the third direction (Z-axis direction). The output wiring OL1 of the first standard cell SC1 may include an output active contact OCNT and a wiring active contact WCNT, and the output wiring OL2 of the second standard cell SC2 may include an upper wiring pattern 240. Accordingly, the output wiring OL2 of the second standard cell SC2 may be disposed on a level higher than a level of the output wiring OL1 of the first standard cell SC1 in the third direction.

For example, the output wiring OL1 of the first standard cell SC1 may be disposed on a level lower than a level of the lower wiring patterns 230 providing input wirings in the second standard cell SC2, and the output wiring OL2 of the second standard cell SC2 may be disposed on a level higher than a level of the lower wiring patterns 230. Further, the output wiring OL1 of the first standard cell SC1 may be in contact with the dummy active region 205 of the first filler cell FC1, may extend to the first filler cell FC1, and may be in contact with the lower wiring pattern 230 providing one of the input wirings of the second standard cell SC2.

As described with reference to FIG. 10, at least a portion of the transistors PM1-PM3 and NM1-NM3 may receive the first power supply voltage VDD or the second power supply voltage VSS. Referring to FIG. 9, at least a portion of the active contacts 220 may be connected to one of the power supply wirings M1 (VDD) and M1 (VSS) through the power contact 227. However, the power contact 227 may not be disposed in the region in which the output active contact OCNT and the wiring active contact WCNT are connected to each other.

In the semiconductor device 200 in an example embodiment, a routing path connecting at least a portion of the standard cells to each other may be provided by a dummy active contact of a filler cell disposed therebetween. For example, a routing path for transferring an output signal of the first standard cell SC1 as an input signal of the second standard cell SC2 may be provided by the dummy active contact of the first filler cell FC1. Accordingly, by reducing the number of wiring patterns desired to transmit signals between the standard cells, freedom in design may increase, and RC properties of the semiconductor device may improve.

In the example embodiment in FIG. 9, the first standard cell SC1 may be disposed in the first standard cell region, the second standard cell SC2 may be disposed in the second standard cell region, and the first filler cell FC1 may be disposed in the first filler cell region FC1. The output active contact OCNT and the wiring active contact WCNT included in the output wiring OL may be provided as an active contact 220 by being integrated with each other, and may extend in the second direction in the first standard cell region and the first filler cell region.

The active contact 220 providing the output wiring OL may be connected to one of the lower wiring patterns 230, which extend in the first direction in the first filler cell region and the second standard cell region, to provide an input wiring through an active vias 225, which may be a lower via. Accordingly, the active contact 220 providing the output wiring OL may be disposed on a level lower than a level of the lower wiring pattern 230 providing the input wiring in the third direction.

Figure 12:
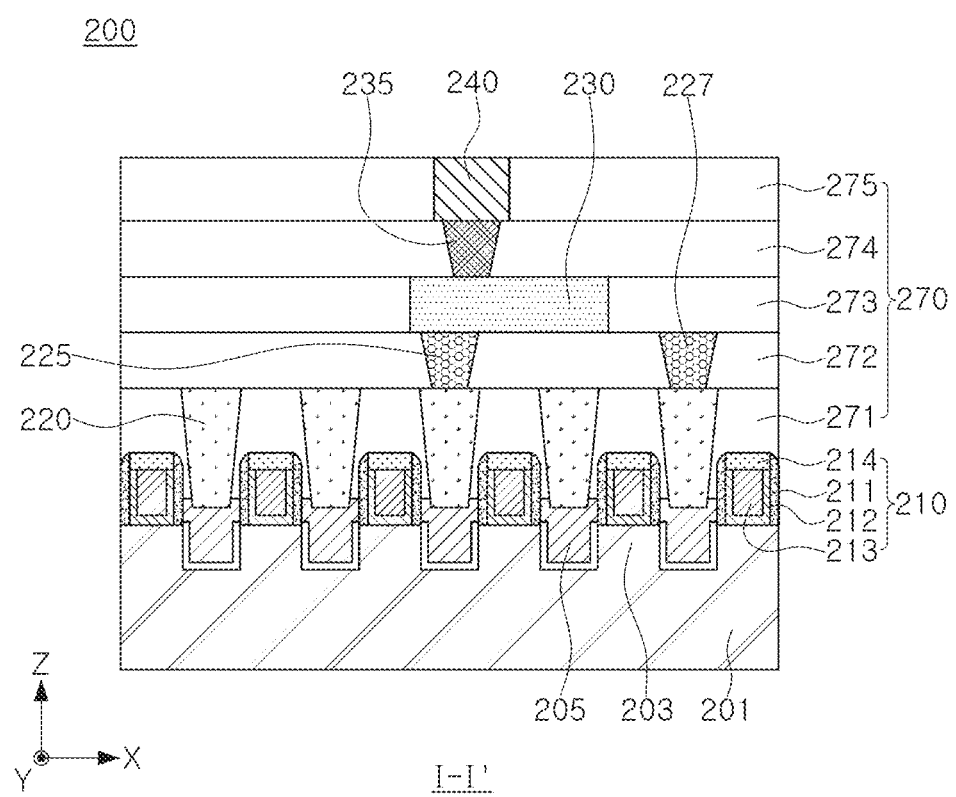
FIG. 12 is a cross-sectional diagram taken along line I-I' in FIG. 9.
Figure 13:
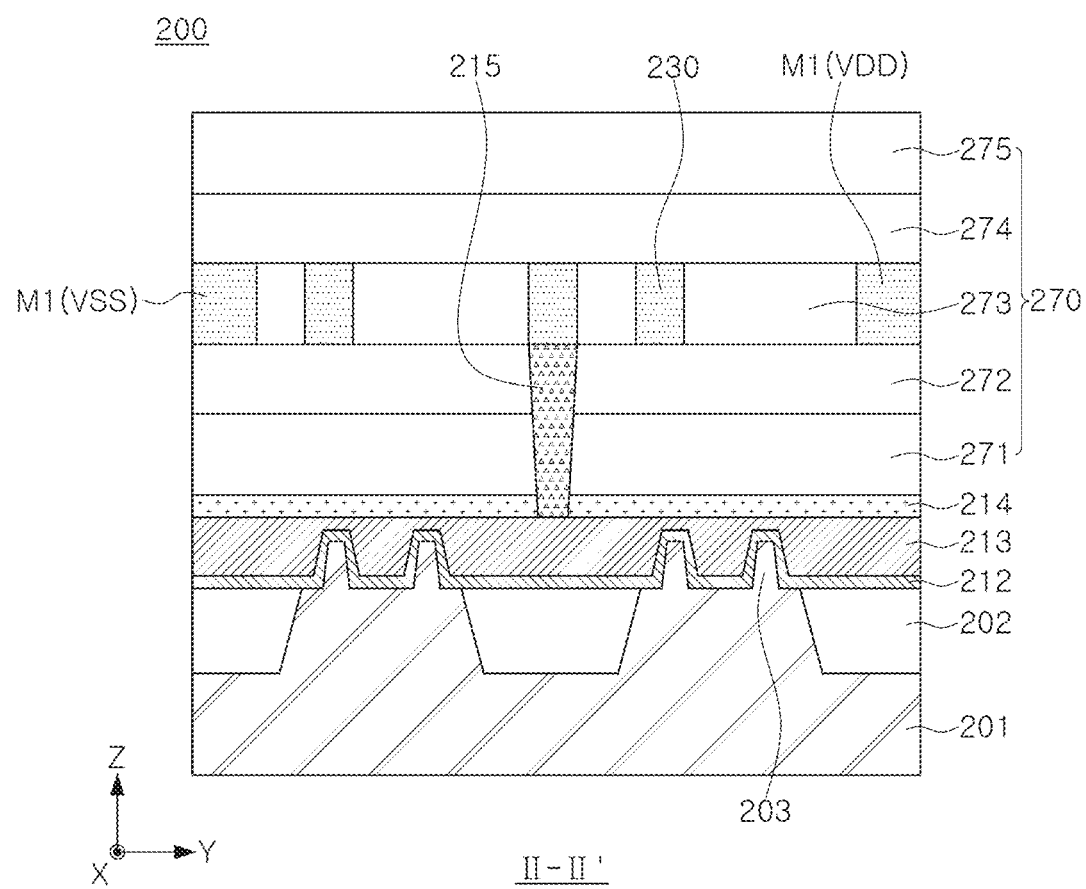
FIG. 13 is a cross-sectional diagram taken along line II-II' in FIG. 9.
Figure 14:
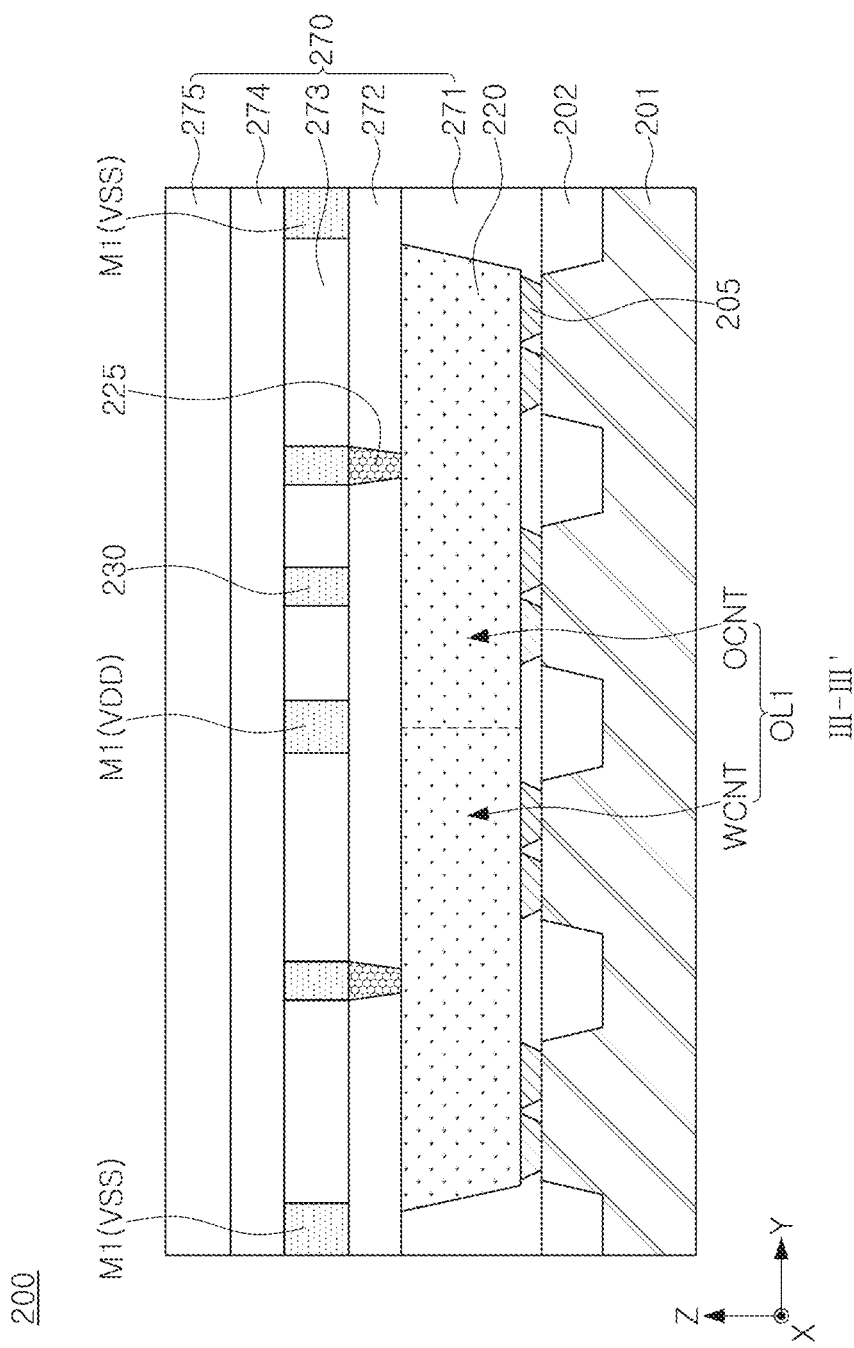
FIG. 14 is a cross-sectional diagram taken along line III-III' in FIG. 9.

FIG. 12 is a cross-sectional diagram taken along line I-I' in FIG. 9. FIG. 13 is a cross-sectional diagram taken along line II-II' in FIG. 9. FIG. 14 is a cross-sectional diagram taken along line III-III' in FIG. 9.

Referring to FIGS. 12 to 14, the semiconductor device 200 in an example embodiment may include active regions 205 formed on the semiconductor substrate 201, gate structures 210 disposed between the active regions 205, and active contacts 220 connected to the active regions 205. A channel region 203 may be defined between the active regions 205 disposed side by side in the first direction (X-axis direction), and at least one of the gate structures 210 may be disposed on the channel region 203. The gate structures 210 may extend in the second direction (Y-axis direction).

In the example embodiment described with reference to FIGS. 12 to 14, it may be assumed that the channel region 203 included in the semiconductor device 200 may be provided by fin structures, but differently from the example, the channel region 203 may be implemented as a nanowire or a nanosheet formed on the semiconductor substrate 201 and surrounded by the gate structures 210. The structure in which the channel region 203 is implemented as a nanowire or a nanosheet may be referred to as gate-all-around (GAA) or multi-bridge channel FET (MBCFET™). When the channel region 203 is implemented as a nanowire or a nanosheet, the channel region 203 may be separated from the semiconductor substrate 201 in the third direction (the Z-axis direction). In some example embodiments, the channel region 203 may not protrude in the third direction, and upper surfaces of the active regions 205 may be coplanar with the upper surfaces of the channel region 203. Thus, each of the semiconductor devices may be implemented as a horizontal transistor.

Referring to FIG. 12, each of the gate structures 210 may include a gate spacer 211, a gate insulating layer 212, a gate conductive layer 213, and a capping layer 214. However, the structure of each of the gate structures 210 may be varied in example embodiments. For example, a thickness and/or a material of the gate insulating layer 212 may be varied in consideration of a threshold voltage of each of the semiconductor devices, or a material and/or a stack structure of the gate conductive layer 213 may be varied.

The active contacts 220 may be disposed side by side with the gate structures 210 in the first direction and may be connected to the active regions 205. The active contacts 220 may be formed of metal, metal silicide, and polysilicon, and may include two or more layers formed of different materials. In an example, each of the active contacts 220 may include a metal silicide layer and a metal layer, and in an example embodiment, each of the active contacts 220 may include a metal silicide layer in direct contact with the active regions 205, and a metal layer disposed on the metal silicide layer.

At least one of the active contacts 220 may be connected to one of the lower wiring patterns 230 through an active via 225 disposed thereon. The active via 225 and the lower wiring patterns 230 may also include a plurality of layers, and may include a barrier metal layer and a fill metal layer, for example. In some example embodiments, the lower wiring patterns 230 and the active via 225 may be formed in a single operation. In this case, the lower wiring patterns 230 and the barrier metal layer of the active via 225 may be integrated with and connected to each other as a single layer, and the fill metal layers may also be integrated with and connected to each other as a single layer.

The lower wiring pattern 230 illustrated in FIG. 12 may be connected to the upper wiring pattern 240 through one of the upper vias 235. For example, the layer on which the lower wiring patterns 230 are disposed may be defined as a first wiring layer, and the layer on which the upper wiring patterns 240 are disposed may be defined as a second wiring layer.

In an example embodiment, the positions of the lower wiring patterns 230 disposed in the first wiring layer may be predefined in each of the standard cells, whereas the positions of at least a portion of the wiring patterns disposed on the second wiring layer may not be predefined in each of the standard cells, and the standard cells may be connected to each other by determining the position of the upper wiring pattern 240 in the second wiring layer after the standard cells are disposed during the placement and routing operation.

However, in an example embodiment, standard cells may be connected to each other using a dummy active contact disposed in the filler cell as the wiring active contact WCNT instead of the upper wiring pattern 240. In this case, at least a portion of the routing paths connecting the standard cells to each other may not pass through the second wiring layer, and the number of lower wiring patterns 230 disposed on the first wiring layer to implement the routing paths may also be reduced. Accordingly, freedom in wiring design may increase and the length of the routing path may decrease, thereby improving performance of the semiconductor device 200.

The semiconductor device 200 may include an interlayer insulating layer 270, and the interlayer insulating layer 270 may include a plurality of interlayer insulating layers 271-275. For example, the first interlayer insulating layer 271 may be disposed on the same level as a level of the gate structures 210 and the active contacts 220, and the second interlayer insulating layer 272 may be disposed on the same level as a level of the lower vias 215 and 225. The third interlayer insulating layer 273 may be disposed on the same level as a level of the first wiring layer, the fourth interlayer insulating layer 274 may be disposed on the same level as a level of the upper vias 235, and the fifth interlayer insulating layer 275 may be disposed on the same level as a level of the second wiring layer. The interlayer insulating layer 270 may be formed of silicon oxide, silicon nitride, silicon oxynitride, or the like.

Referring to FIG. 13, the semiconductor devices may be separated from each other in the semiconductor device 200 by a device isolation film 202 formed on the semiconductor substrate 201. For example, the semiconductor devices disposed on both sides of the device isolation film 202 in the second direction may be a PMOS device and an NMOS device, respectively.

The channel region 203 may be provided by fin structures extending in a third direction perpendicular to the upper surface of the semiconductor substrate 201, and among the gate structures 210, the gate insulating layer 212 may have a shape going over the fin structure. In other words, both side surfaces and upper surfaces of the fin structures may be in contact with the gate insulating layer 212. Referring to FIG. 13, the gate insulating layer 212 may be in contact with side surfaces and upper surfaces of the fin structures, and a gate conductive layer 213 and a capping layer 214 may be formed on the gate insulating layer 212.

The gate via 215 may be connected to the gate conductive layer 213, and may penetrate the first interlayer insulating layer 271 and the second interlayer insulating layer 272, for example. A lower surface of the gate via 215 may be in contact with the gate conductive layer 213, and an upper surface of the gate via 215 may be disposed in a position higher than the upper surface of the active contacts 220. For example, an upper surface of the gate via 215 may be disposed on the same level as a level of an upper surface of the second interlayer insulating layer 272.

The gate via 215 may be connected to at least one of the lower wiring patterns 230 extending from the first wiring layer in the first direction. The lower wiring patterns 230 may be disposed on the same level as a level of the power supply wirings M1 (VDD) and M1 (VSS) extending in the first direction along the boundary between the standard cells and the filler cells.

Referring to FIG. 14, as described in the aforementioned example embodiment with reference to FIG. 13, the semiconductor devices may be separated from each other by the device isolation film 202 formed on the semiconductor substrate 201. For example, the semiconductor devices disposed on both sides of the single device isolation film 102 in the second direction may be a PMOS device and an NMOS device, respectively. Accordingly, the active regions 205 disposed on one side of the device isolation film 202 and the active regions 205 disposed on the other side of the device isolation film 202 may be doped with impurities of different types of conductivity.

As described above, the active regions 205 may be connected to the channel region 203 in the first direction. For example, the active regions 205 may be formed by applying a selective epitaxial growth process to the semiconductor substrate 201. The active regions 205 may be connected to the active contacts 220, and for example, the active contacts 220 may be formed to be recessed into a portion of the active regions 205. The active regions 205 physically separated from each other in the second direction may be electrically connected to each other by the active contacts 220, respectively.

Referring to FIG. 14, lower surfaces of the active vias 225 may be disposed on the same level as a level of the upper surface of the first interlayer insulating layer 271 and may be in contact with the active contacts 220. Accordingly, the lower surfaces of the active vias 225 may be disposed in a region between the upper surfaces of the gate structures 210 and the upper surfaces of the gate vias 215 in the third direction. However, an example embodiment thereof is not limited thereto, and in other example embodiments, the arrangement forms of the active vias 225, the gate structures 210, and the gate via 215 and the level on which the active vias 225, the gate structures 210, and the gate via 215 are disposed may be varied.

As described in the aforementioned example embodiment with reference to FIG. 9, the first standard cell SC1 and the first filler cell FC1 may be adjacent to each other in the second direction. Further, referring to FIG. 14, the output active contact OCNT, which may be one of the active contacts 220 included in the first standard cell SC1, may be integrated with and connected to the wiring active contact WCNT which may be a dummy active contact included in the first filler cell FC1. As illustrated in FIG. 14, the output active contact OCNT and the wiring active contact WCNT may be in contact with each other below the first power supply wiring M1 (VDD) extending in the first direction along the boundary between the first filler cell FC1 and the first standard cell SC1, and may provide an output wiring OL1. An output signal of the first standard cell SC1 may be output through the output wiring OL1.

As illustrated in FIG. 14, the output wiring OL1 which may be a routing path for transmitting an output signal of the first standard cell SC1 may be formed using the dummy active contact of the first filler cell FC1 adjacent to the first standard cell SC1 as the wiring active contact WCNT. Accordingly, the number of lower wiring patterns 230 and upper wiring patterns 240 formed in the first standard cell SC1 may be reduced, and the degree of freedom in wiring design may improve. Further, as compared to the example in which a routing path is formed using the upper wiring patterns 240, the length of the output wiring OL1 may be reduced, and electrical properties of the semiconductor device 200 may improve. Hereinafter, an example embodiment will be described in greater detail with reference to FIG. 15 in the description below.

Figure 15:
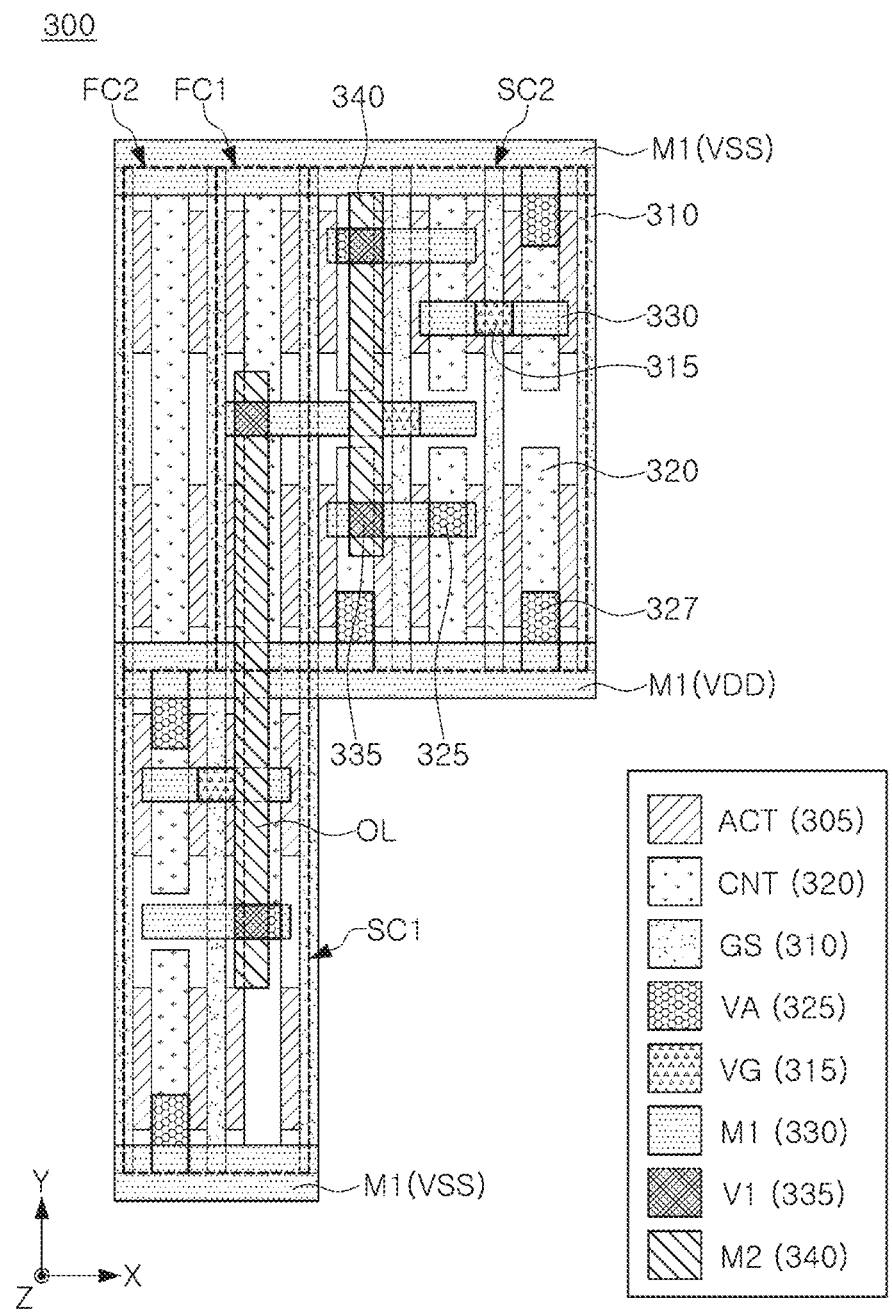
FIG. 15 is a plan diagram illustrating a partial region of a semiconductor device according to a comparative example of the present disclosure.

FIG. 15 is a plan diagram illustrating a partial region of a semiconductor device according to a comparative example.

Referring to FIG. 15, a semiconductor device 300 according to a comparative example may include a first standard cell SC1, a second standard cell SC2, a first filler cell FC1, and a second filler cell FC2, similarly to the semiconductor device 200 in the aforementioned example embodiment described with reference to FIG. 9. The circuit provided by each of the standard cells SC1 and SC2 may be the same as in the aforementioned example embodiment described with reference to FIG. 9, and the output signal of the inverter circuit provided by the first standard cell SC1 may be transmitted to the NAND gate circuit provided by the second standard cell SC2 as an input signal.

In the comparative example illustrated in FIG. 15, the routing path for transferring the output signal of the inverter circuit provided by the first standard cell SC1 to the NAND gate circuit provided by the second standard cell SC2 as an input signal may be provided by one of the upper wiring patterns 340. Referring to FIG. 15, the active contact 320 to which the output signal of the first standard cell SC1 is output may be connected to the upper wiring pattern 340 through the active via 325, the lower wiring pattern 330, and the upper via 335. The upper wiring pattern 340 may extend in the second direction (the Y-axis direction) and may provide the output wiring OL.

The output wiring OL may extend to the first filler cell FC1, and may be connected to the lower wiring pattern 330 through the upper via 335 in the first filler cell FC1. The lower wiring pattern 330 may extend from the first filler cell FC1 to the second standard cell SC2 in the first direction (X-axis direction), and may be connected to one of the gate structures 310 in the second standard cell SC2 through the gate via 315.

In other words, in the comparative example illustrated in FIG. 15, the routing path connecting the output node of the first standard cell SC1 to the input node of the second standard cell SC2 may include an active contact 320, an active via 325, a lower wiring pattern 330, and an upper via 335 of the first standard cell SC1. Also, the routing path may further include an upper wiring pattern 340 extending between the first standard cell SC1 and the first filler cell FC1, an upper via 335 of the first filler cell FC1, and a lower wiring pattern 330 extending from the first filler cell FC1 to the second standard cell SC2.

Differently from the above example, in the example embodiment described with reference to FIG. 9, the routing path connecting the output node of the first standard cell SC1 to the input node of the second standard cell SC2 may include the output active contact OCNT of the first filler cell FC1, the wiring active contact WCNT of the first filler cell FC1, the active via 225 of the first filler cell FC1, and the lower wiring pattern 330 extending from the first filler cell FC1 to the second standard cell SC2. Accordingly, in the example embodiment described with reference to FIG. 9, a routing path having the same function may be further reduced and may be formed in a simpler manner than in the comparative example illustrated in FIG. 15.

Figure 16:
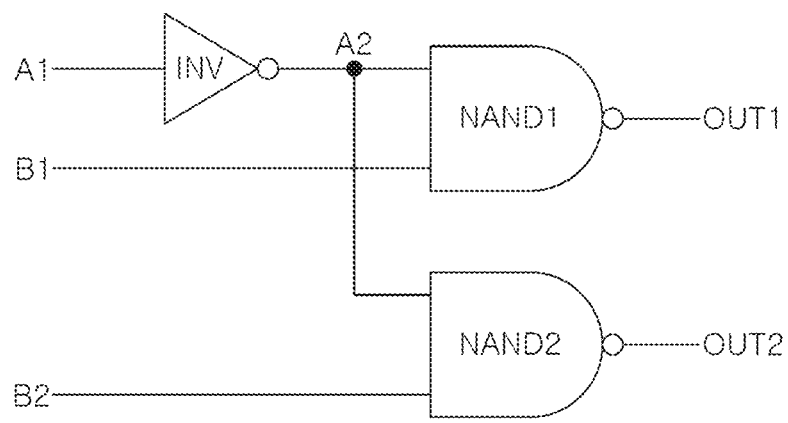
FIG. 16 is a circuit diagram illustrating a circuit provided by a partial region of a semiconductor device an example embodiment of the present disclosure.

FIG. 16 is a circuit diagram illustrating a circuit provided by a partial region of a semiconductor device according to an example embodiment.

Referring to FIG. 16, a semiconductor device in an example embodiment may include one inverter circuit INV and two NAND gate circuits NAND1 and NAND2. The inverter circuit INV may invert the input signal A1 and may output the output signal A2, and the output signal A2 of the inverter circuit INV may be input to the first NAND gate circuit NAND1 and the second NAND gate circuit NAND1 NAND2 as input signals.

The first NAND gate circuit NAND1 may receive the output signal A2 of the inverter circuit INV as the first input signal A2, may receive another second input signal B1 and may output the first output signal OUT1. The second NAND gate circuit NAND2 may receive the output signal A2 of the inverter circuit INV as the first input signal A2, may receive another third input signal B2, and may output the second output signal OUT2.

In the semiconductor device, the inverter circuit INV and the NAND gate circuits NAND1 and NAND2 may be provided by different standard cells. For example, the inverter circuit INV may be provided by the first standard cell, the first NAND gate circuit NAND1 may be provided by the second standard cell, and the second NAND gate circuit NAND2 may be provided by the third standard cell. In the description below, the arrangement form and the connection structure of the inverter circuit INV and the NAND gate circuits NAND1 and NAND2 will be described with reference to FIGS. 17 to 19.

Figure 17:
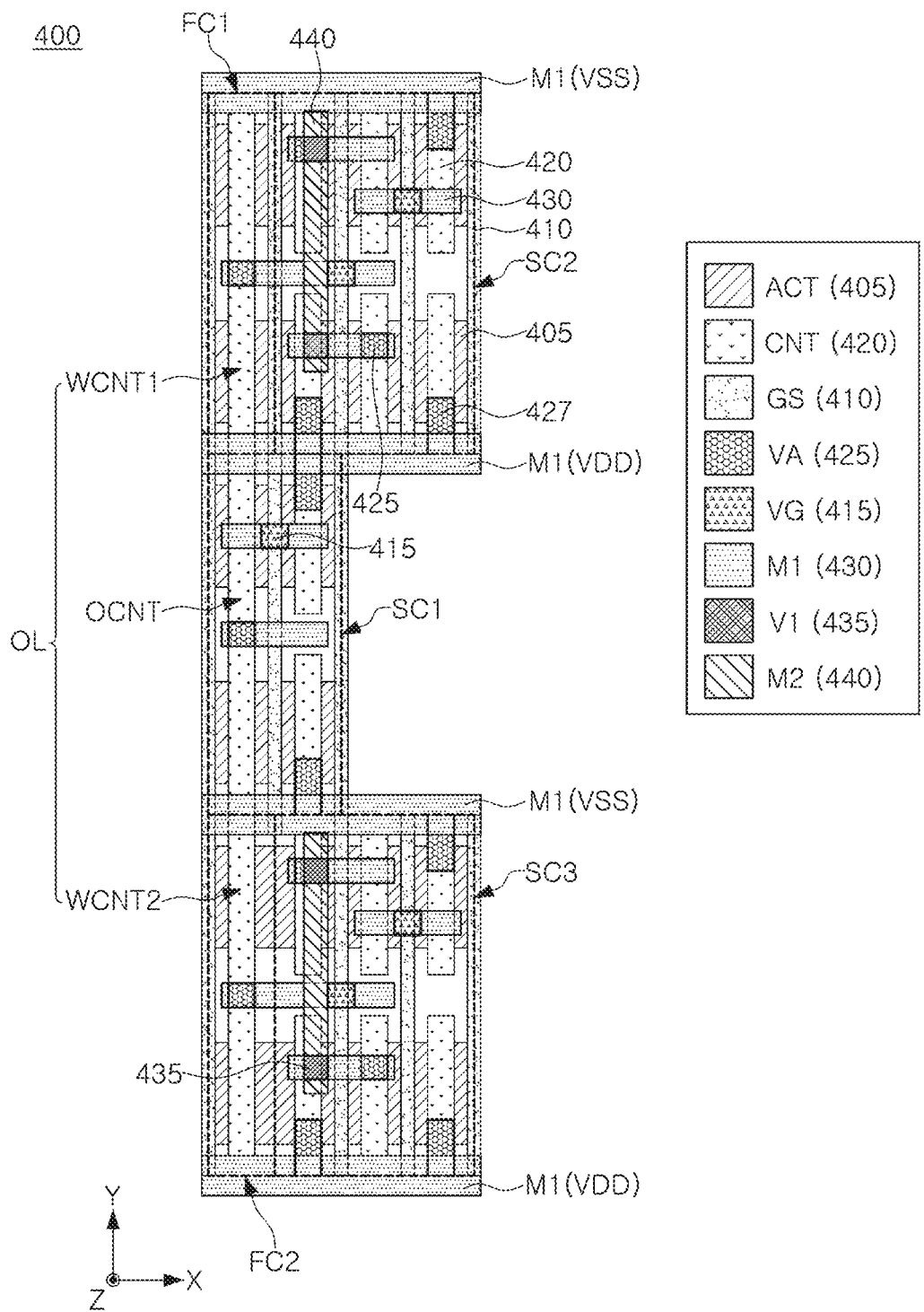
FIGS. 17 to 19 are plan diagrams illustrating a partial region of a semiconductor device providing the circuit illustrated in FIG. 16.
Figure 18:
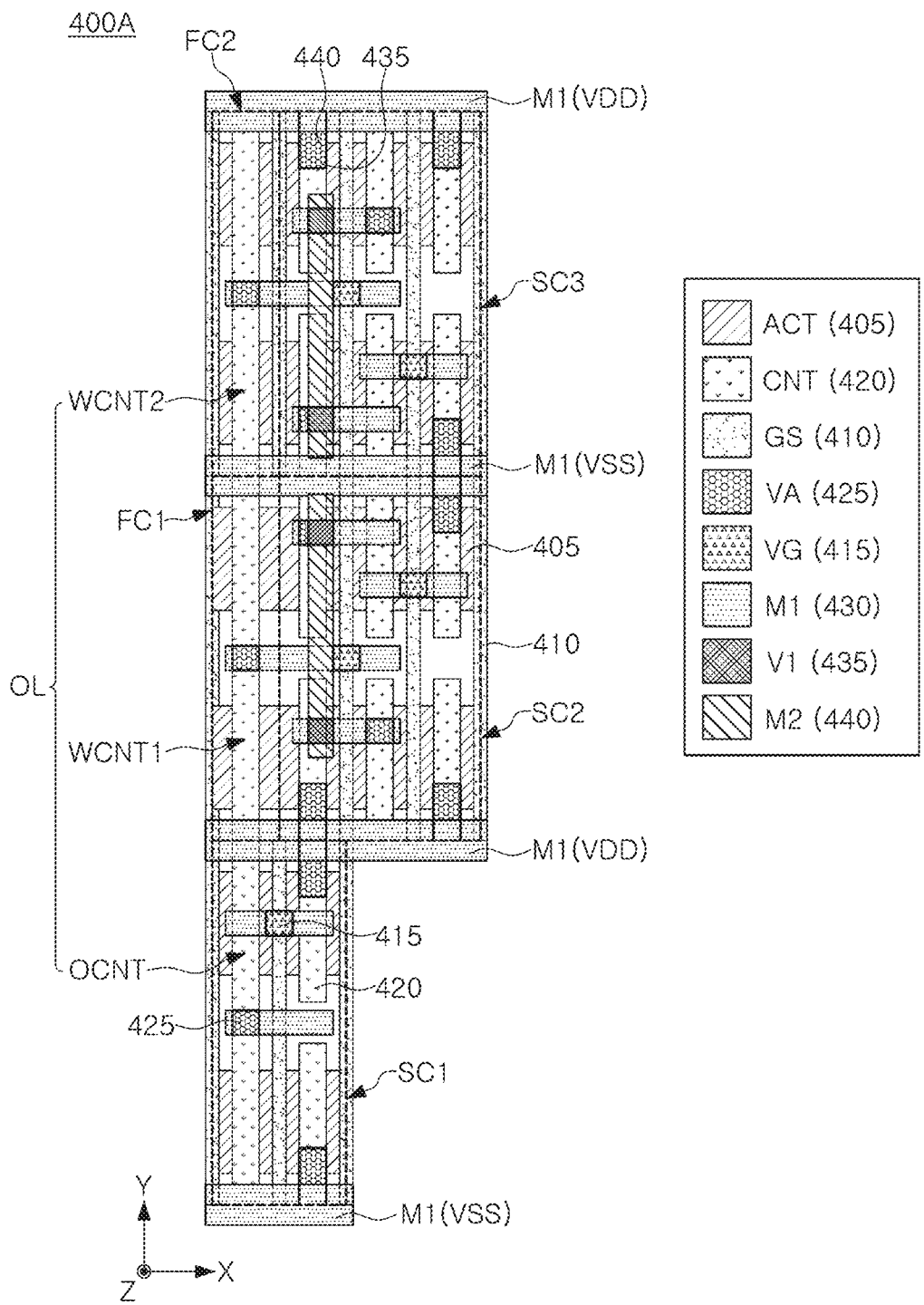
Figure 19:
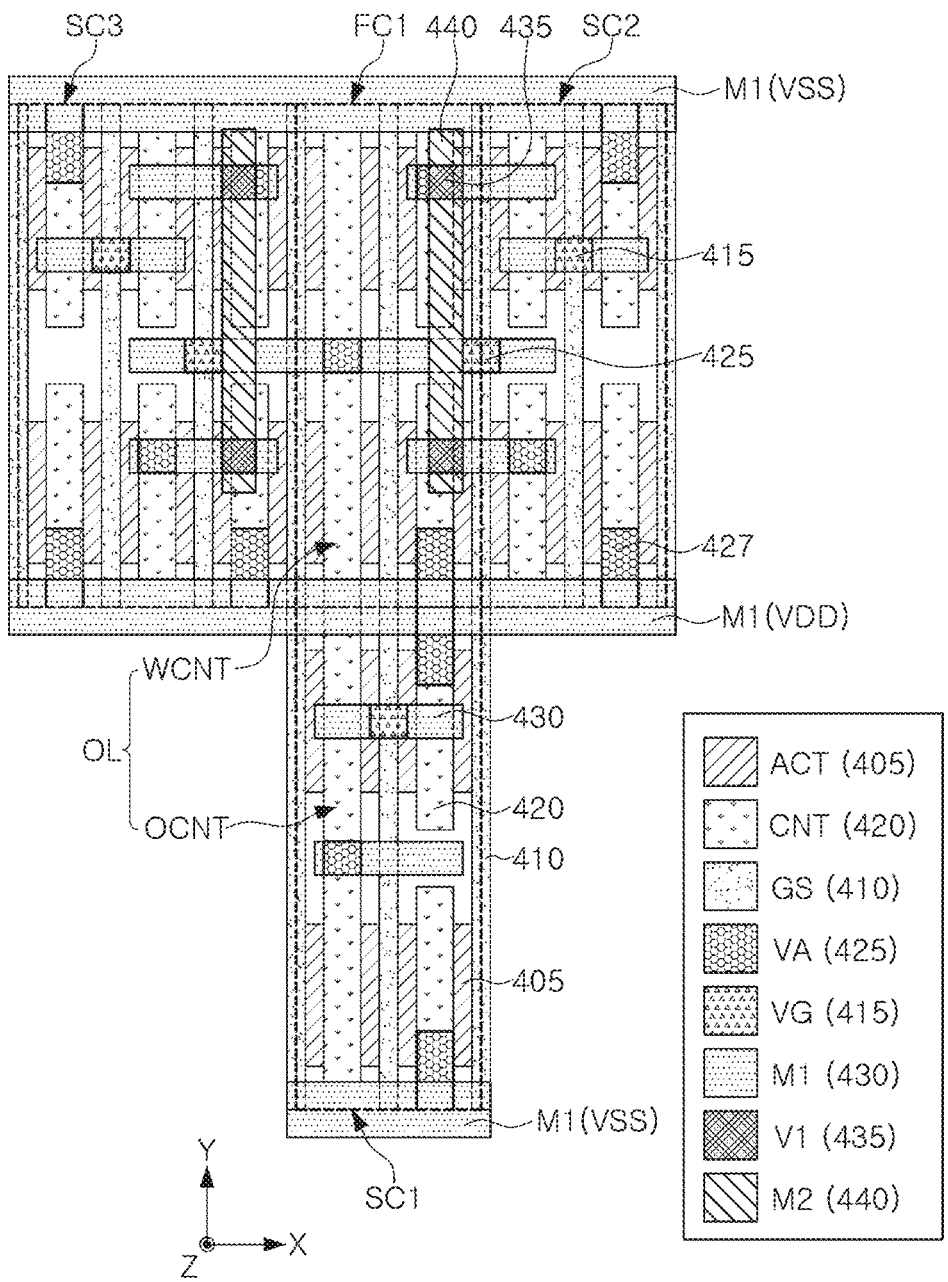

FIGS. 17 to 19 are plan diagrams illustrating a partial region of a semiconductor device providing the circuit illustrated in FIG. 16.

In the example embodiments illustrated in FIGS. 17 to 19, the first to third standard cells SC1-SC3 may provide the inverter circuit INV and the NAND gate circuits NAND1 and NAND2 described in the aforementioned example embodiment with reference to FIG. 16. For example, the first standard cell SC1 may provide the inverter circuit INV, the second standard cell SC2 may provide the first NAND gate circuit NAND1, and the third standard cell SC3 may provide the second NAND gate circuit NAND2. At least one of the standard cells SC1-SC3 may be adjacent to at least one of the filler cells FC1 and FC2 in the first direction (the X-axis direction) and/or the second direction (the Y-axis direction).

Referring to FIGS. 17 to 19, each of the standard cells SC1-SC3 and the filler cells FC1 and FC2 may include active regions 405 extending in the first direction, gate structures 410 extending in the second direction and intersecting the gate structures 405. For example, one of the gate structures 410 and the active regions 405 disposed on both sides thereof may provide a transistor. The active regions 405 may be connected to the active contacts 420, and the active contacts 420 and the gate structures 410 may be connected to the lower wiring patterns 430 through the lower vias 415 and 425.

At least a portion of the standard cells SC1-SC3 may include upper vias 435 and upper wiring patterns 440 connected to at least one of the lower wiring patterns 430. In FIGS. 17 to 19, the lower wiring patterns 430 may extend in the first direction and the upper wiring patterns 440 may extend in the second direction, but example embodiments thereof are not limited thereto.

Referring to FIG. 17, the first standard cell SC1 may be adjacent to the first filler cell FC1 and the second filler cell FC2 in the second direction on both sides. The first filler cell FC1 may be adjacent to the first standard cell SC1 in the second direction and may be adjacent to the second standard cell SC2 in the first direction. The second filler cell FC2 may be adjacent to the first standard cell SC1 in the second direction and may be adjacent to the third standard cell SC3 in the first direction.

To provide the circuit as illustrated in FIG. 16, the output node of the first standard cell SC1 may need to be connected to an input node for receiving the first input signal A2 among the input nodes of the second standard cell SC2, and simultaneously, the output node of the first standard cell SC1 may need to be connected to an input node for receiving the first input signal A2 among the input nodes of the third standard cell SC3.

In the semiconductor device 400 according to the example embodiment illustrated in FIG. 17, the output active contact OCNT providing an output node among the active contacts 420 of the first standard cell SC1 may be integrated with and connected to the first wiring active contact WCNT1 of the filler cell FC1 and the second wiring active contact WCNT2 of the second filler cell FC2. Each of the first wiring active contact WCNT1 and the second wiring active contact WCNT2 may be a dummy active contact.

Accordingly, the output wiring OL extending in the second direction from the first standard cell SC1, the first filler cell FC1, and the second filler cell FC2 may be formed. The output wiring OL may intersect two or more power supply wirings M1 (VDD) and M1 (VSS).

The first wiring active contact WCNT1 included in the output wiring OL may be connected to the lower wiring pattern 430 through the active via 425 in the first filler cell FC1. The lower wiring pattern 430 connected to the first wiring active contact WCNT1 may be connected to one of the gate structures 410 of the second standard cell SC2. Also, the second wiring active contact WCNT2 included in the output wiring OL may be connected to the lower wiring pattern 430 through the active via 425 in the second filler cell FC2. The lower wiring pattern 430 connected to the second wiring active contact WCNT2 may be connected to one of the gate structures 410 of the third standard cell SC3. Accordingly, the output signal A2 of the inverter circuit INV provided by the first standard cell SC1 may be simultaneously transmitted to each of the second standard cell SC2 and the third standard cell SC3 through the output wiring OL.

Thereafter, in a semiconductor device 400A according to the example embodiment illustrated in FIG. 18, the first standard cell SC1 may be adjacent to the first filler cell FC1 on one side in the second direction. The first filler cell FC1 may be adjacent to the second standard cell SC2 in the first direction, and may be adjacent to the second filler cell FC2 in the second direction. The second filler cell FC2 may be adjacent to the third standard cell SC3 in the first direction. Accordingly, the first filler cell FC1 may be disposed between the first standard cell SC1 and the second filler cell FC2 in the second direction.

To provide a circuit as illustrated in FIG. 16, the output node of the first standard cell SC1 may need to be connected to an input node for receiving the input signal A2 among the input nodes of each of the second standard cell SC2 and the third standard cell SC3. Referring to FIG. 18, among the active contacts 420 of the first standard cell SC1, the output active contact OCNT providing an output node may be integrated with and connected to the first wiring active contact WCNT1 of the first filler cell FC1 and the second wiring active contact WCNT2 of the second filler cell FC2. Each of the first wiring active contact WCNT1 and the second wiring active contact WCNT2 may be a dummy active contact.

However, the arrangement of the standard cells SC1-SC3 and the filler cells FC1 and FC2 may be different from the example embodiment described with reference to FIG. 17, and the first wiring active contact WCNT1 may be disposed between the output active contact OCNT and the second wiring active contact WCNT2. An output wiring OL extending from the first standard cell SC1, the first filler cell FC1, and the second filler cell FC2 in the second direction may be formed, and the output wiring OL may cross two or more power supply wirings M1 (VDD) and M1 (VSS).

The first wiring active contact WCNT1 included in the output wiring OL may be connected to the lower wiring pattern 430 through the active via 425 in the first filler cell FC1. The lower wiring pattern 430 connected to the first wiring active contact WCNT1 may be connected to one of the gate structures 410 of the second standard cell SC2. Also, the second wiring active contact WCNT2 included in the output wiring OL may be connected to the lower wiring pattern 430 through the active via 425 in the second filler cell FC2. The lower wiring pattern 430 connected to the second wiring active contact WCNT2 may be connected to one of the gate structures 410 of the third standard cell SC3. Accordingly, the output signal A2 of the inverter circuit INV provided by the first standard cell SC1 may be simultaneously input to each of the second standard cell SC2 and the third standard cell SC3 through the output wiring OL.

Thereafter, in the semiconductor device 400B according to the example embodiment illustrated in FIG. 19, the first standard cell SC1 may be adjacent to the first filler cell FC1 on one side in the second direction. The first filler cell FC1 may be adjacent to the second standard cell SC2 and the third standard cell SC3 on both sides in the first direction.

To provide the circuit as illustrated in FIG. 16, the output node of the first standard cell SC1 may need to be connected to the input node for receiving the input signal A2 among the input nodes of each of the second standard cell SC2 and the third standard cell SC3. Referring to FIG. 18, an output active contact OCNT providing an output node among the active contacts 420 of the first standard cell SC1 may be integrated with and connected to the wiring active contact WCNT, which may be a dummy active contact of the first filler cell FC1.

However, the number of filler cells FC1 may be smaller, and the arrangement of the standard cells SC1-SC3 and the filler cell FC1 may be different from the aforementioned example embodiments described with reference to FIGS. 17 and 18. Referring to FIG. 19, the output wiring OL extending from the first standard cell SC1 and the first filler cell FC1 in the second direction may be formed, and the output wiring OL may cross the first power supply wiring M1 (VDD).

The wiring active contact WCNT included in the output wiring OL may be connected to the lower wiring pattern 430 through the active via 425 in the first filler cell FC1. The lower wiring pattern 430 connected to the wiring active contact WCNT may include a boundary between the second standard cell SC2 and the first filler cell FC1 and a boundary between the third standard cell SC3 and the first filler cell FC1. Further, the lower wiring pattern 430 connected to the wiring active contact WCNT may be connected to one of the gate structures 410 of the second standard cell SC2 and may be connected to one of the gate structures 410 of the third standard cell SC3. Accordingly, the output signal A2 of the inverter circuit INV provided by the first standard cell SC1 may be simultaneously input to each of the second standard cell SC2 and the third standard cell SC3 through the output wiring OL.

As described with reference to FIGS. 17 to 19, the standard cells SC1-SC3 connected to each other, and the filler cells FC1 and FC2 providing the dummy active contact as a routing path for connecting the standard cells SC1-SC3 may be disposed in various manners. Also, depending on a design of a routing path, the number of filler cells FC1 and FC2 desired to connect the standard cells SC1-SC3 may also be varied.

Figure 20:
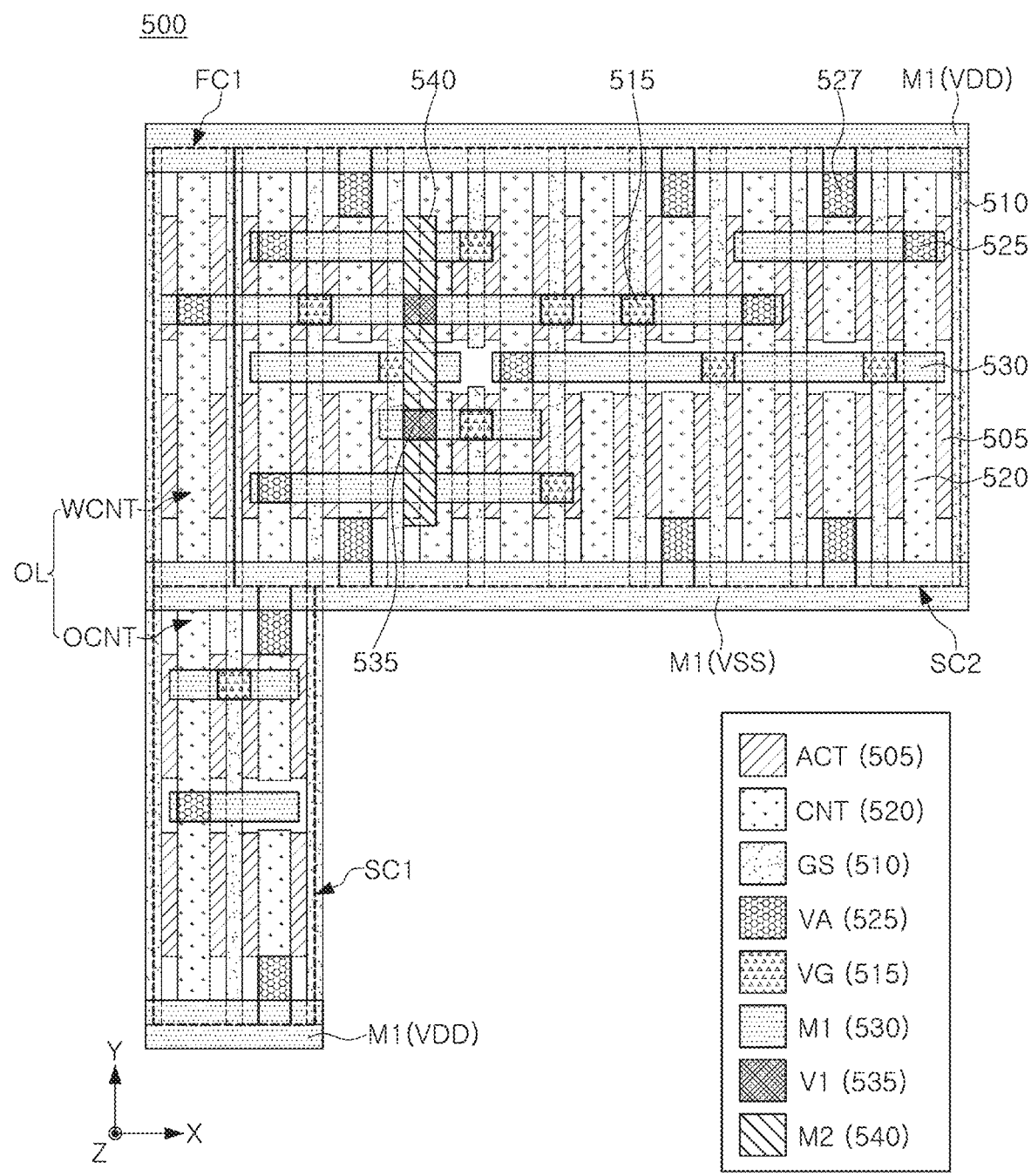
FIG. 20 is a plan diagram illustrating a partial region of a semiconductor device according to an example embodiment of the present disclosure.

FIG. 20 is a plan diagram illustrating a partial region of a semiconductor device according to an example embodiment.

Referring to FIG. 20, a semiconductor device 500 in an example embodiment may include a first standard cell SC1, a second standard cell SC2, and a first filler cell FC1. FIG. 20 illustrates a partial region of the semiconductor device 500, and the semiconductor device 500 may include a greater number of standard cells and a greater number of filler cells in addition to the first standard cell SC1, the second standard cell SC2, and the first filler cell FC1.

The first standard cell SC1 and the second standard cell SC2 may provide different unit circuits. For example, the first standard cell SC1 may provide an inverter circuit, and the second standard cell SC2 may provide a latch circuit. The first filler cell FC1 may be adjacent to the second standard cell SC2 in the first direction (X-axis direction), and may be adjacent to the first standard cell SC1 in the second direction (Y-axis direction). In the semiconductor device 500, the output signal of the first standard cell SC1 may be input to the second standard cell SC2.

Referring to FIG. 20, each of the first standard cell SC1, the second standard cell SC2, and the first filler cell FC1 may include active regions 505 extending in the first direction (X-direction) and gate structures 510 extending in the second direction (Y-direction) and intersecting the active regions 505. The active regions 505 may be connected to the active contacts 520, and at least a portion of the gate structures 510 and the active contacts 520 may be connected to at least one of the lower wiring patterns 530 through gate vias 515 and active vias 525. At least a portion of the lower wiring patterns 530 may be connected to at least one of the upper wiring patterns 540 through the upper vias 535.

Referring to FIG. 20, the output active contact OCNT providing the output node of the inverter circuit INV in the first standard cell SC1 may be integrated with and connected to the wiring active contact WCNT among dummy active contacts of the first filler cell FC1. The output active contact OCNT and the wiring active contact WCNT may be integrated with and connected to each other below the first power supply wiring M1 (VDD) extending in the first direction and may provide the output wiring OL.

The wiring active contact WCNT included in the output wiring OL may be connected to one of the lower wiring patterns 530 through the active via 525 in the first filler cell FC1. The lower wiring pattern 530 connected to the wiring active contact WCNT may extend to the second standard cell SC2 in the first direction, and may be connected to at least one of the gate structures 510 through the gate via 515 in the second standard cell SC2. Accordingly, an output node in the first standard cell SC1 outputting an output signal may be connected to one of the input nodes of the second standard cell SC2.

According to the aforementioned example embodiments, a semiconductor device including standard cells and filler cells disposed between the standard cells may be provided. To connect the first standard cell to the second standard cell receiving the output signal of the first standard cell as an input signal to each other, the active contact of the filler cell adjacent to the first standard cell and the second standard cell may be used as a wiring. Accordingly, the routing wiring conventionally formed by a metal wiring may be formed below the metal wirings, and the degree of freedom in design may increase, and by efficiently disposing the wirings, integration density of the semiconductor device may improve.

While some example embodiments have been illustrated and described above, it will be apparent to those skilled in the art that modifications and variations could be made without departing from the scope of the present disclosure as defined by the appended claims.

What is claimed is:
1. A semiconductor device, comprising:
 a first standard cell and a second standard cell disposed in at least one of a first direction and a second direction intersecting the first direction, the first direction and the second direction being parallel to an upper surface of a substrate, and each of the first standard cell and the second standard cell including at least one gate structure and at least one active region; and a first filler cell adjacent to the first standard cell in the second direction and adjacent to the second standard cell in the first direction, wherein an output node of the first standard cell is connected to an input node of the second standard cell, wherein an output active contact providing the output node of the first standard cell is connected to a first wiring active contact among at least one dummy active contact included in the first filler cell, and wherein at least one input wiring providing the input node of the second standard cell is connected to the first wiring active contact.

2. The semiconductor device of claim 1, further comprising:

power supply wirings extending in the first direction and separated from each other by a distance in the second direction, wherein the output active contact and the first wiring active contact are connected to each other to constitute an integral body below a corresponding one of the power supply wirings.

3. The semiconductor device of claim 2, wherein the power supply wirings include first power supply wirings configured to supply a first power voltage and second power supply wirings configured to supply a second power voltage lower than the first power voltage, and the first power supply wirings and the second power supply wirings are alternately disposed in the second direction.

4. The semiconductor device of claim 2, wherein a length of at least one of the first standard cell and the second standard cell in the second direction is equal to a distance between a pair of the power supply wirings adjacent to each other in the second direction.

5. The semiconductor device of claim 2, wherein the power supply wirings are on a same level as a level of the input wiring in a third direction perpendicular to the upper surface of the substrate.

6. The semiconductor device of claim 1, wherein the input wiring extends in the first direction.

7. The semiconductor device of claim 1, wherein the input wiring is connected to the gate structure included in the second standard cell through a gate via in the second standard cell.

8. The semiconductor device of claim 1, wherein a width of the first filler cell in the first direction is smaller than a width of each of the first standard cell and the second standard cell in the first direction.

9. The semiconductor device of claim 1, wherein
each of the first standard cell and the second standard cell includes two or more active regions separated from each other in the first direction, and
the first filler cell includes only a dummy active region connected to the first wiring active contact.

10. The semiconductor device of claim 1, wherein the input wiring and the first wiring active contact of the second standard cell are connected to each other through an active via disposed between the input wiring and the first wiring active contact in a direction perpendicular to the upper surface of the substrate.

11. The semiconductor device of claim 1, further comprising:
a third standard cell different from the first standard cell and the second standard cell,
wherein an input node of the third standard cell is connected to the output node of the first standard cell.

12. The semiconductor device of claim 11, wherein
at least one input wiring providing the input node of the third standard cell is integrally connected to the output active contact and the first wiring active contact, and
the at least one input wiring providing the input node of the third standard cell is connected to a second wiring active contact included in a second filler cell different from the first filler cell.

13. The semiconductor device of claim 12, wherein the second standard cell and the third standard cell are in a same position in the first direction and are in different positions in the second direction.

14. The semiconductor device of claim 12, wherein the first filler cell and the second filler cell are on both sides of the first standard cell in the second direction.

15. The semiconductor device of claim 12, wherein
the first filler cell is between the second filler cell and the first standard cell in the first direction, and
the output active contact is connected to the second wiring active contact through the first wiring active contact.

16. The semiconductor device of claim 11, wherein
at least one input wiring providing the input node of the third standard cell is connected to the first wiring active contact, and
the first filler cell is between the second standard cell and the third standard cell in the first direction.

17. A semiconductor device, comprising:
a plurality of standard cell regions disposed in a first direction and a second direction intersecting the first direction, the first direction and the second direction being parallel to an upper surface of a substrate, the plurality of standard cell regions including a first standard cell and a second standard cell, each of the first standard cell and the second standard cell including at least one gate structure and at least one active region; and
at least one filler cell region being between a pair of adjacent ones of the plurality of standard cell regions, the at least one filler cell region including at least one filler cell,
wherein the plurality of standard cell regions include a first standard cell region including the first standard cell and a second standard cell region including the second standard cell, the at least one filler cell region includes a first filler cell region that include a first filler cell, the first standard cell region is adjacent to the first filler cell region in the second direction, and the second standard cell region is adjacent to the first filler cell region in the first direction, and
wherein an active contact extending in the second direction in the first standard cell region and the first filler cell region is connected to at least one input wiring extending in the first direction in both the second standard cell region and the first filler cell region, by a lower via.

18. The semiconductor device of claim 17, wherein the active contact is on a level lower than a level of the at least one input wiring in a third direction perpendicular to the upper surface of the substrate.

19. The semiconductor device of claim 17, wherein an upper surface of the lower via is in direct contact with the at least one input wiring, and a lower surface of the lower via is in direct contact with the active contact.

20. A semiconductor device, comprising:
a first standard cell providing a first unit circuit;

a second standard cell at a position different from a position of the first standard cell in one of a first direction and a second direction intersecting the first direction, the first direction and the second direction being parallel to an upper surface of a substrate, the second standard cell providing a second unit circuit; and a first filler cell adjacent to the second standard cell in the first direction, adjacent to the first standard cell in the second direction, and having a dummy active region, wherein each of the first standard cell and the second standard cell includes at least one input wiring and at least one output wiring, the output wiring in the first standard cell is on a level lower than a level of the input wiring thereof, and the output wiring in the second standard cell is on a level higher than a level of the input wiring thereof, and wherein the output wiring of the first standard cell extends to the first filler cell, and is in contact with both the dummy active region and the input wiring of the second standard cell that extends to the first filler cell, in a third direction perpendicular to the upper surface of the substrate.

* * * * *